US008583805B2

(12) United States Patent
Hlasny

(10) Patent No.: US 8,583,805 B2
(45) Date of Patent: Nov. 12, 2013

(54) COMMUNICATION PERIOD MANAGEMENT IN A COMMUNICATION SYSTEM

(75) Inventor: Daryl J. Hlasny, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 129 days.

(21) Appl. No.: 13/275,031

(22) Filed: Oct. 17, 2011

(65) Prior Publication Data

US 2012/0042068 A1 Feb. 16, 2012

Related U.S. Application Data

(63) Continuation of application No. 10/315,620, filed on Dec. 10, 2002, now Pat. No. 8,069,254, which is a continuation-in-part of application No. 10/006,440, filed on Nov. 20, 2001, now Pat. No. 7,024,482.

(60) Provisional application No. 60/272,630, filed on Feb. 28, 2001.

(51) Int. Cl.
*G06F 15/173* (2006.01)
*G06F 15/16* (2006.01)
*H04L 12/28* (2006.01)
*H04L 12/56* (2011.01)

(52) U.S. Cl.
USPC ......... 709/227; 709/224; 709/225; 370/395.4

(58) Field of Classification Search
None
See application file for complete search history.

(56) References Cited

U.S. PATENT DOCUMENTS

| 4,988,989 A | 1/1991 | Goto |
| 5,475,870 A | 12/1995 | Weaver et al. |
| 5,506,848 A | 4/1996 | Drakopoulos et al. |
| 5,557,320 A | 9/1996 | Krebs |
| 5,734,833 A | 3/1998 | Chiu et al. |
| 5,790,974 A | 8/1998 | Tognazzini |
| 5,793,747 A | 8/1998 | Kline |
| 5,815,561 A * | 9/1998 | Nguyen et al. ........... 379/115.01 |
| 5,844,890 A | 12/1998 | Delp et al. |

(Continued)

FOREIGN PATENT DOCUMENTS

| JP | 11-239114 | 8/1999 |
| JP | 11239152 | 8/1999 |

(Continued)

OTHER PUBLICATIONS

Baatz, Simon et al., "Adaptive Scatternet Support for Bluetooth using Sniff Mode," IEEE Conference on Local Computer Networks, pp. 112-120, 2001.

(Continued)

*Primary Examiner* — Azizul Choudhury
(74) *Attorney, Agent, or Firm* — Austin Rapp & Hardman

(57) ABSTRACT

A method for communication period management in a communication system is disclosed. The method may involve determining a duration of a communication period that is scheduled between two electronic devices. The method may then involve determining whether the duration exceeds a threshold. If the duration does not exceed the threshold, the communication period may be unscheduled. Furthermore, the unscheduled time may be rescheduled with another communication period to another electronic device. The method may also involve determining whether a conflict exists between the communication period and any other communication periods that are scheduled to involve either of the electronic devices. If a conflict exists, the communication period may be unscheduled.

17 Claims, 19 Drawing Sheets

(56) References Cited

U.S. PATENT DOCUMENTS

| | | |
|---|---|---|
| 5,877,759 A | 3/1999 | Bauer |
| 5,905,730 A * | 5/1999 | Yang et al. .................. 370/429 |
| 6,016,478 A | 1/2000 | Zhang et al. |
| 6,031,832 A * | 2/2000 | Turina .......................... 370/348 |
| 6,047,000 A | 4/2000 | Tsang et al. |
| 6,064,673 A | 5/2000 | Anderson et al. |
| 6,115,390 A | 9/2000 | Chuah |
| 6,134,217 A | 10/2000 | Stiliadis et al. |
| 6,167,379 A | 12/2000 | Dean et al. |
| 6,198,728 B1 | 3/2001 | Hulyalkar et al. |
| 6,438,134 B1 | 8/2002 | Chow et al. |
| 6,519,595 B1 | 2/2003 | Rose |
| 6,728,253 B1 | 4/2004 | Jeffries et al. |
| 6,728,270 B1 | 4/2004 | Meggers et al. |
| 6,891,857 B1 * | 5/2005 | Nevo et al. .................. 370/480 |
| 6,988,128 B1 | 1/2006 | Alexander et al. |
| 6,993,587 B1 | 1/2006 | Basani et al. |
| 7,030,812 B2 | 4/2006 | Bekritsky et al. |
| 7,050,452 B2 | 5/2006 | Sugar et al. |
| 2002/0159434 A1 | 10/2002 | Gosior et al. |

FOREIGN PATENT DOCUMENTS

| | | |
|---|---|---|
| JP | 11-252113 | 9/1999 |
| JP | 2000-307601 | 11/2000 |
| JP | 2001-111599 | 4/2001 |
| JP | 2002-051028 | 2/2002 |
| WO | 0141348 | 6/2001 |

OTHER PUBLICATIONS

Johansson, Per, "The Jump Mode for Active Inter-Piconet Scheduling a Discussion Paper," Ericsson Corporate Research, Rev. PA2, Nov. 2000.

* cited by examiner

COMMUNICATION PERIOD MANAGEMENT IN A COMMUNICATION SYSTEM

RELATED APPLICATIONS

This application is a Continuation of U.S. patent application Ser. No. 10/315,620 filed Dec. 10, 2002, for "Communication Period Management in a Communication System," with inventor Daryl Hlasny, which is incorporated herein by reference, which is a Continuation-in-part of U.S. patent application Ser. No. 10/006,440 filed Nov. 20, 2001, for "Pseudo-Random Dynamic Scheduler for Scheduling Communication Periods Between Electronic Devices," with inventor Daryl Hlasny, which is incorporated herein by reference, which is related to and claims priority from U.S. Patent Application Ser. No. 60/272,630 filed Feb. 28, 2001, for "Effective Scheduling of Inter System Communication," with inventor Daryl Hlasny, which is incorporated herein by reference.

TECHNICAL FIELD

This invention relates generally to electronic devices, and is more particularly directed toward systems and methods for scheduling communication periods between electronic devices.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Computers typically have one or more processors. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and tells the processors what to do to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

With the increased use of electronic devices and embedded systems, and with the increased demands for the exchange of information, more devices are now able to detect surrounding devices and establish electronic communications with these devices. The Bluetooth specification defines one standard whereby devices can communicate with each other through short-range radio signals. Many kinds of devices may benefit from being able to connect to other devices without needing user intervention. For example, printers, personal digital assistants, digital cameras, telephones, laptop computers, video monitors, electronic calendars, desktops, fax machines, keyboards, joysticks, etc., may all become part of a short-range radio system to connect to other devices. By enabling this type of communication, a bridge is provided to existing data networks to form small private ad hoc groupings of connected devices away from fixed network infrastructures. Thus, device networks may be formed on-the-fly as devices discover each other. However, as more devices attempt to communicate with one another, inefficiencies may arise that may slow down or otherwise hinder the overall communication of one or more electronic devices. Thus, benefits may be realized if communications by electronic devices were enhanced with additional systems and methods for providing more effective communication techniques.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Figure 1A:
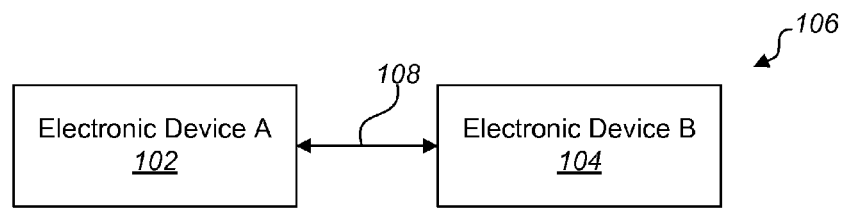
FIG. 1A is a block diagram of an embodiment of a device pair.

FIG. 1A is a block diagram illustrating two electronic devices 102, 104 that comprise a device pair 106. The device pair 106 may enter into communication 108 with one another. Some examples of an electronic device 102, 104 are a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, a thermostat, and the like.

Figure 1B:
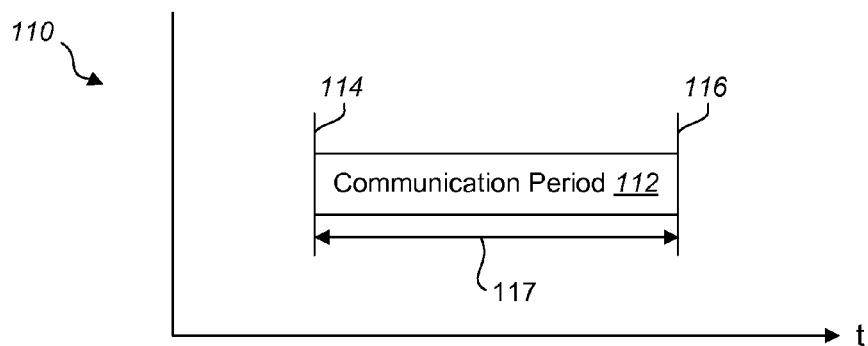
FIG. 1B is a communication period diagram for an embodiment of a device pair.

FIG. 1B illustrates an embodiment of a communication period diagram that includes a schedule 110 for a communication period 112 between the two devices 102, 104 of the device pair 106. Typically a schedule 110 is created for each pair 106 of devices that wish to communicate. The schedule 110 may be specific to the device pair 106 and may be known by both devices 102, 104. As shown, the schedule 110 may include time points 114, 116 that signal the initiation and termination of the communication between the device pair 106. The time between the initiation time point 114 and the termination event 116 is called the communication period 112.

An initiation time point 114 is the typical method used to start communication between two devices 102, 104. Both devices 102, 104 are usually aware of the initiation time point 114 so that they may start communication at this time.

In the embodiment of FIG. 1A, either device 102, 104 may terminate communication. A device may arbitrarily terminate the communication period 112, but typically the period 112 is terminated by a conflicting time point from another device pair schedule. Termination may be accomplished by signaling between the device pair 106 on a per connection basis. A termination time point 116 may be used to end the communication period 112 but is not essential. Termination time points 116 are created by the schedule negotiation process that is carried out between pairs of devices.

Typically, initiation time points 114 are determined by a predetermined pseudo random schedule that is unique and random relative to the pseudo random schedule for other interconnected devices pairs. Initiation time points 114 may also be determined by a negotiation between each pair of devices where the negotiated time point is within a valid communication period as determined by the predetermined pseudo random schedule. The negotiation process is performed between device pairs and is used to create free time in the schedule for other purposes.

A device pair 106 typically consists of one device that has the role of master with respect to the connection and another device that has the role of slave. The master device typically initiates and controls the connection, while the slave responds to the master's commands. The schedule typically uses the time base of the clock of the master device. The slave device may maintain synchronization with this clock. Another time base may be used if available to both devices.

Figure 1C:
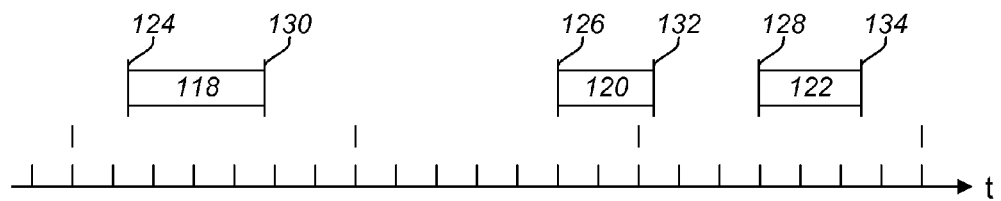
FIG. 1C is a communication period diagram for an embodiment of a device pair illustrating a series of communication periods.

FIG. 1C is a communication period diagram illustrating a series of communication periods 118, 120, 122 comprised of multiple initiation time points 124, 126, 128 and termination time points 130, 132, 134 and/or terminating events. In many situations, the device pair 106 may continue to communicate with each other over a period of time. These communications may take place in several communication periods 118, 120, 122, rather than one continuous communication period 112.

Figure 2A:
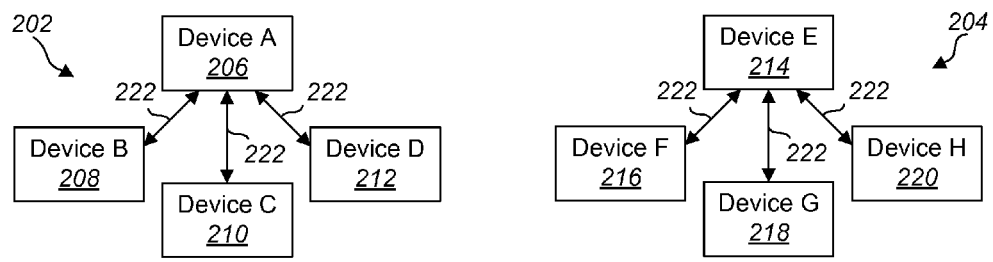
FIG. 2A is a block diagram of two device networks.

Although FIGS. 1A-1C illustrated two devices 102, 104 communicating with one another, in some situations there may be more than two devices communicating with each other. For example, and as shown in FIG. 2A, two device networks 202, 204 may exist. Device A 206, device B 208, device C 210 and device D 212 comprise a first device network 202. The second device network 204 includes device E 214, device F 216, device G 218 and device H 220. FIG. 2A illustrates two separate device networks 202, 204, or, in other words, two distinct systems.

The first device network 202 includes one master and three slaves. Device A 206 serves as the master, while device B 208, device C 210 and device D 212 serve as slaves. The second device network 204 also includes a master (device E 214) and three slaves (device F 216, device G 218, and device H 220). As shown, intrasystem communication 222 may take place between the devices in the first device network 202 and in the second device network 204.

One exemplary application of the embodiments herein may be with the Bluetooth standard and the relevant personal area network technology relating to Bluetooth. The Bluetooth standard is described in the Specification of the Bluetooth System, incorporated herein by reference. Depending on the particular communication system type, the application of the schedulers disclosed herein can be extended to what were previously considered internal system links. This may be particularly applicable to a Bluetooth system where a piconet is an independent system. In Bluetooth terms, the device networks 202, 204 may both be piconets. When an interpiconet connection is made, the schedulers disclosed herein may be applied to both the new connection and to the previous intra-piconet connection of that device to its piconet master, if one previously existed.

Of course, it will be appreciated by those skilled in the art that the embodiments and inventive principles disclosed herein are not limited to personal area network technology and/or to Bluetooth networks. The inventive principles herein may be applied to various types of communications systems that include electronic devices and/or computers that communicate with each other.

Further to the example shown in FIGS. 2A-2D, there are generally three possible ways of connecting the two networks 202, 204. As stated above, in FIGS. 2A-2D device A 206 and device E 214 serve as masters, while the other devices serve as slaves. Thus, master/slave relationships exist between the masters and slaves of each device network 202, 204.

Figure 2B:
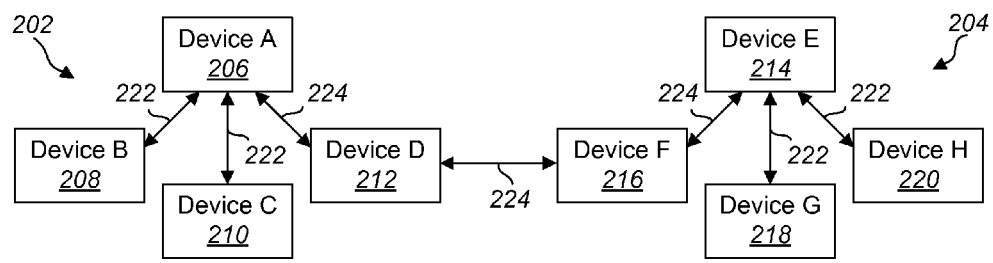
FIG. 2B is a block diagram of two device networks with an intersystem communication link between two network devices.

FIG. 2B illustrates an intersystem communication link 224 between device D 212 and device F 216. The scheduling apparatus and methods disclosed herein may be used with the intersystem communication link 224. As shown, the links between device A 206 and device D 212 and between device E 214 and device F 216 may also be treated as intersystem links 224. Thus, the original connection between each slave and its master may now be treated as an intersystem link because the slave devices may not be available to the master at all times with the additional link. Communications between device A 206 and device D 212 and between device E 214 and device F 216 may be rescheduled because the capacity of the slaves (device D 212 and device F 216) is now being shared between two connections rather than just one connection.

Figure 2C:
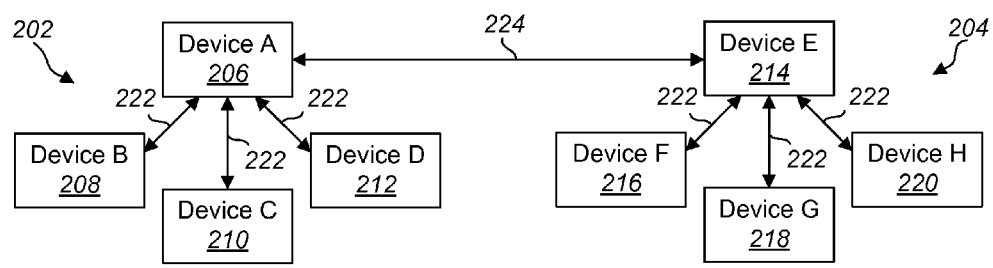
FIG. 2C is a block diagram of two device networks with an intersystem communication link between two network devices.
Figure 2D:
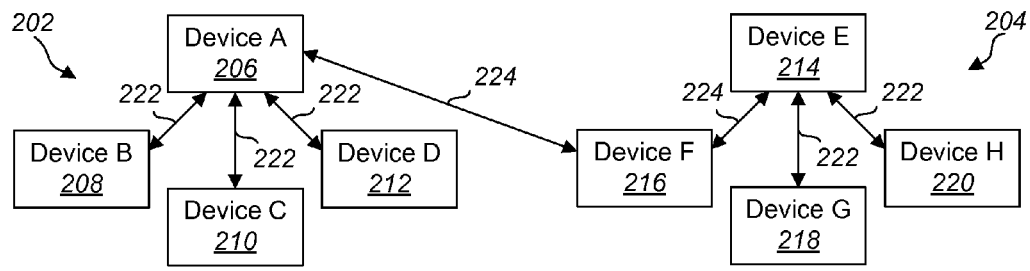
FIG. 2D is a block diagram of two device networks with an intersystem communication link between two network devices.

FIG. 2C illustrates an intersystem communication link 224 between the two master devices 206, 214. FIG. 2D illustrates an intersystem communication link 224 between a master (device A 206) and a slave (device F 216). If the embodiments of FIGS. 2A-2D were implemented and used in a Bluetooth environment, the two systems 202, 204 and the intersystem communication 224 may be referred to as a scatternet. As stated, the embodiments and inventive principles herein are not limited to a Bluetooth environment but have broad application. The embodiments herein provide solutions to the scheduling issues for devices that wish to have an arbitrary number of connections. Further, the embodiments shown herein allow arbitrary topologies of devices to communicate effectively when the connections are treated as intersystem connections.

Figure 3A:
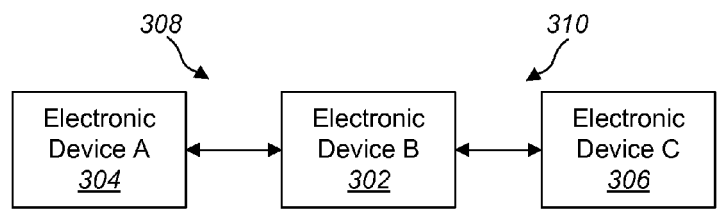
FIG. 3A is a block diagram illustrating an embodiment of two device pairs.

FIG. 3A illustrates a simple system topology consisting of a device (electronic device B 302) that communicates with two other devices (device A 304 and device C 306). Electronic device A 304 and device B 302 make up a device pair 308. Similarly, device B 302 and device C 306 make up a device pair 310. In one embodiment, each device is part of a different device network 202. For example, each device may be part of a different piconet.

Figure 3B:
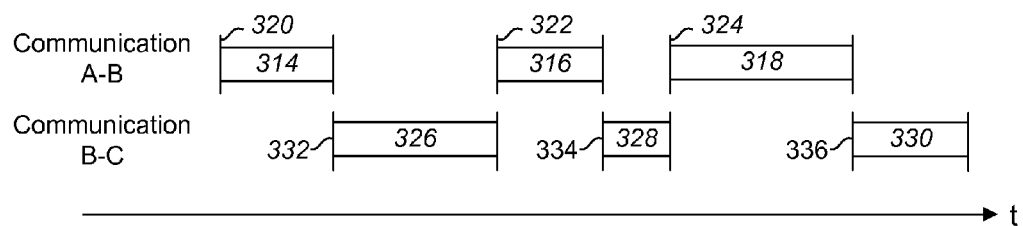
FIG. 3B is a communication period diagram for an embodiment of two device pairs.

For each pair 308, 310 of communicating devices, there is a schedule for communication indicating the initiation time points as shown in FIG. 3B. Communication periods 314, 316, 318 between device B 302 and device A 304 are started through communication A-B initiation time points 320, 322, 324. The initiation time points 320, 322, 324 start a communication period 314, 316, 318 for the corresponding pair 308 of devices 304, 302. Communication periods 326, 328, 330 between device B 302 and device C 306 are started through communication B-C initiation time points 332, 334, 336. These initiation time points 332, 334, 336 start communication periods 326, 328, 330 for the B-C pair 310 of devices 302, 306. As illustrated, each initiation time point becomes the terminating event for the preceding communication period. The end of the communication period is signaled to the other device when another initiation time point occurs that conflicts with the current active communication period. For example, initiation time point 320 starts a communication period 314 between device A 304 and device B 302. This period 314 continues until an initiation time point 332 occurs to signal the beginning of a communication period 326 between device B 302 and device C 306. FIG. 3B illustrates the typical operation for the embodiment shown in FIG. 3A.

Figure 4:
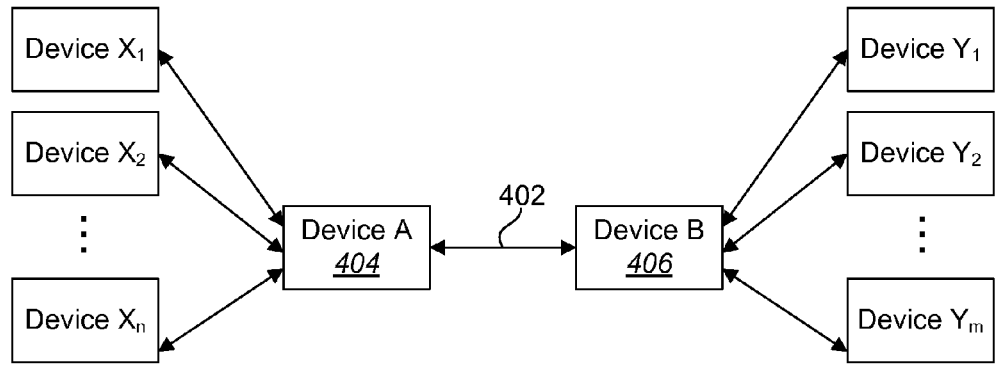
FIG. 4 illustrates a device network topology generalization.

FIG. 4 illustrates a device network topology generalization. A communication link 402 exists between device A 404 and device B 406. Multiple devices $X_1$ to $X_n$ are in electronic communication with device A 404. Similarly, multiple devices $Y_1$ to $Y_m$ are in electronic communication with device B 406. The performance of the system provides fair distribution of capacity. This performance may be generalized in the case where all links are fully utilized. The relationship is given by the equation below for the generalized system that is diagrammed in FIG. 4. The capacity available to link A-B 402 is inversely proportional to the total number of other intersystem links that both device A 404 and device B 406 participate in. The equation below does not take into consideration the overhead due to switching between connections or other signaling overhead needed for system operation. The $Cap_{A-B}$ number indicates the relative capacity available to a connection. It shows the relative amount of time that is utilized for communication between the device pair. This relation is applicable to a system where the density of time points is equal for all intersystem links and each link has a random distribution with respect to the others.

$$Cap_{A-B} = \frac{1}{1+n+m}$$

Figure 5:
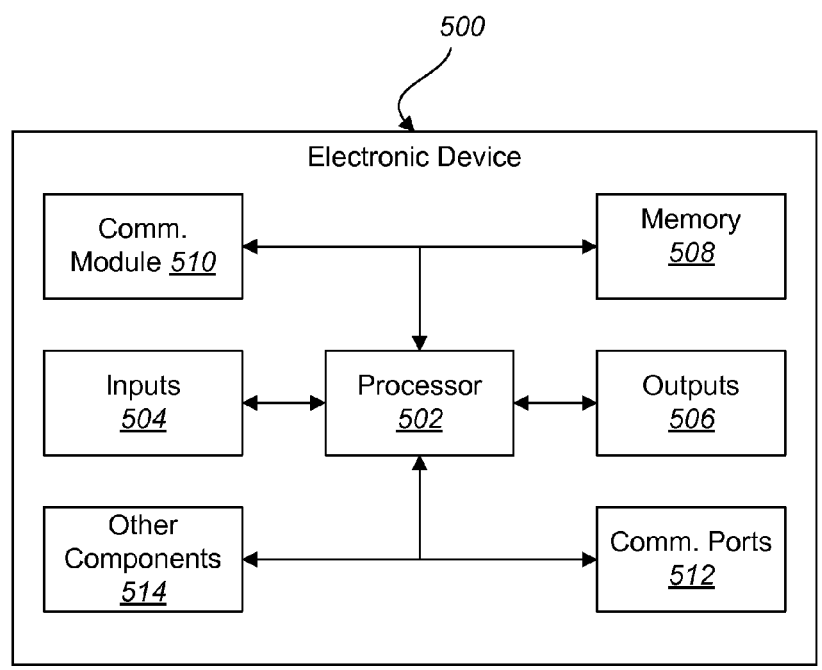
FIG. 5 is block diagram illustrating hardware components of an embodiment of an electronic device.

FIG. 5 is block diagram illustrating the major hardware components typically utilized in an electronic/embedded device 500. An electronic device 500 typically includes a processor 502 in electronic communication with input components or devices 504 and/or output components or devices 506. The processor 502 is operably connected to input 504 and/or output devices 506 capable of electronic communication with the processor 502, or, in other words, to devices capable of input and/or output in the form of an electrical signal. Embodiments of devices 500 may include the inputs 504, outputs 506 and the processor 502 within the same physical structure or in separate housings or structures.

The electronic device 500 may also include memory 508. The memory 508 may be a separate component from the processor 502, or it may be on-board memory 508 included in the same part as the processor 502. For example, microcontrollers often include a certain amount of on-board memory.

The processor 502 is also in electronic communication with a communication module 510. The communication module 510 may be used for communications with other devices. Thus, the communication modules 510 of the various devices may be designed to communicate with each other to send signals or messages between the electronic devices 500.

The electronic device 500 may also include other communication ports 512. In addition, other components 514 may also be included in the electronic device 500.

Of course, those skilled in the art will appreciate the many kinds of different devices that may be used with embodiments herein. Accordingly, the block diagram of FIG. 5 is only meant to illustrate typical components of an embedded device 102, 500 and is not meant to limit the scope of embodiments disclosed herein.

Figure 6:
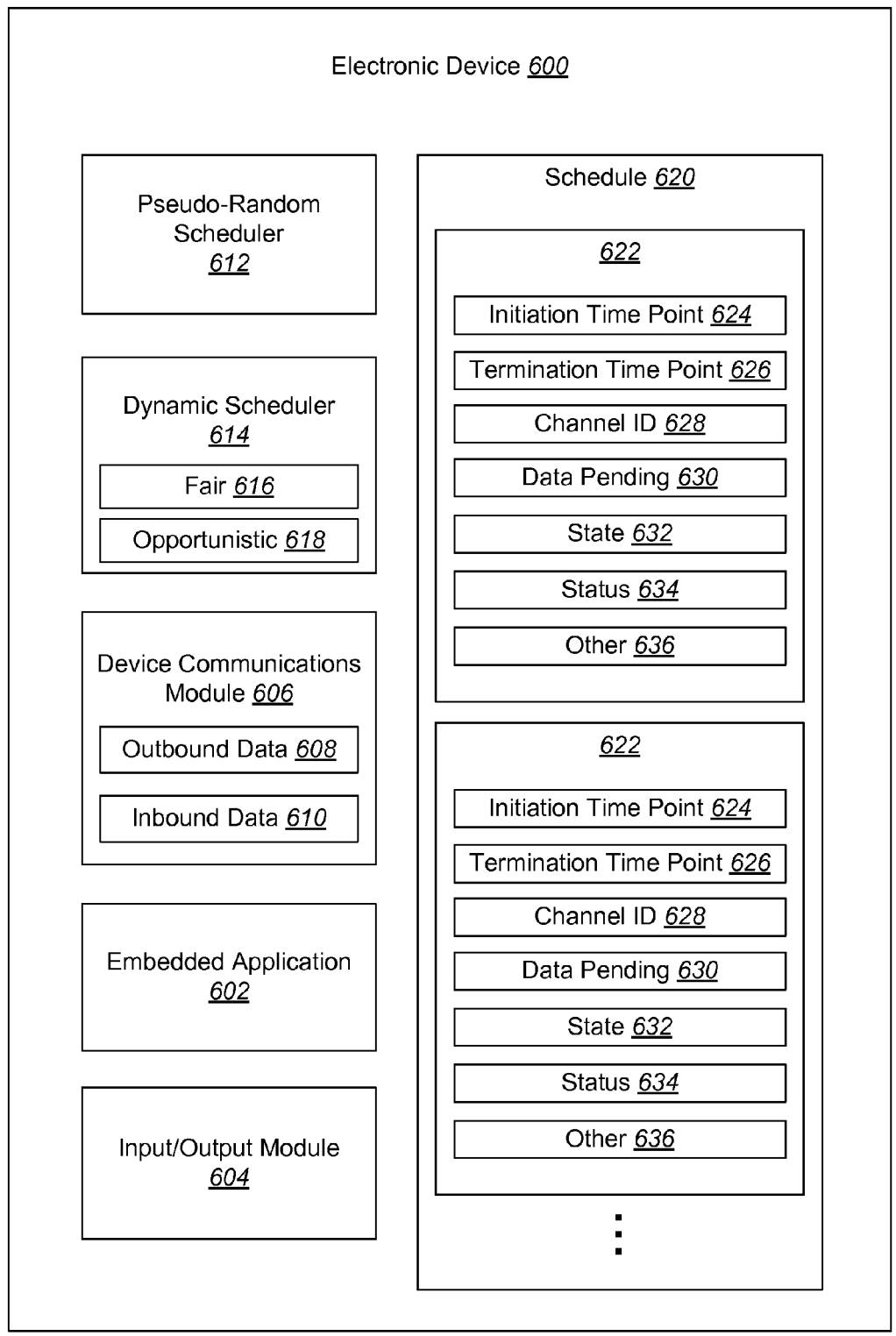
FIG. 6 is block diagram illustrating software components of an embodiment of an electronic device.

FIG. 6 is a block diagram illustrating software modules that may be used with the electronic device 600. An embedded application 602 may be used to operate the electronic device 600. The embedded application 602 may include the functionality needed for operation of the electronic device 600. An input/output module 604 may be used for receiving data from the input(s) 504 and for sending data to the output(s) 506. Depending on the type of electronic device 600, the particular functionality of the input/output module 604 may vary.

A device communications module 606 may be included with functionality to handle incoming and outgoing messages. For example, the device communications module 606 may include the instructions necessary to send and receive communications using the communications module 510. The device communications module 606 may send or transmit outbound data 608 and may receive inbound data 610.

The electronic device 600 typically includes software to accomplish various tasks including communications, input/output and the monitoring or controlling of the device 600. The device communications module 606 represents the computer program routines or instructions that handle the communications through the communications module 510 or through the communications port(s) 512. The input/output module 604 represents the computer program routines or instructions that handle the input to the device 600 and the output from the device 600. For example, if there were buttons (not shown) on the device 600, the input/output module 604 includes the code necessary to process the inputs from the buttons (not shown). The application 602 controls the device 600 and acts as the main program to carry out tasks of the device 600. Those skilled in the art will appreciate that the software blocks are only examples and the configuration of blocks shown are not necessary to practice the present embodiments. As explained earlier, many different types of devices 102, 500, 600 are available and can be used with embodiments herein. These devices usually already have the necessary software loaded to run the device 600. Embodiments herein can be used with almost all electronic devices 102, 500, 600 that are capable of electronic communications and have some processing capability.

The device may also include a pseudorandom scheduler 612 and a dynamic allocation scheduler 614. Both the pseudorandom scheduler 612 and the dynamic allocation scheduler 614 will be discussed below. As will be discussed, the dynamic scheduler 614 may include a fair allocation component 616 and an opportunistic allocation component 618.

A communication schedule 620 may also be included. The communication schedule 620 includes one or more scheduled communication periods 622 involving the electronic device 600. Typically, each communication period 622 includes an initiation time point 624 that defines when the communication period 622 begins. Each communication period 622 may also include a termination time point 626 that defines when the communication period 622 ends. Each communication period 622 may also include a channel identifier 628, data pending 630, state information 632, status information 634, and other information 636, each of which will be more fully discussed below.

A method is disclosed and provided herein to dynamically allocate capacity between intersystem connections in the case where the scheduled allocation is not used by a device pair. A decentralized algorithm is used to distribute this capacity to the intersystem links where traffic is available. The unused capacity is allocated first on a fair basis and then the capacity may be opportunistically allocated where communication is possible. The algorithm attempts to maximize the utilization of communication capacity for each device.

The principle employed to implement fair allocation of unused scheduled capacity is to effectively remove an intersystem connection from a device when there is no traffic without actually disconnecting. This causes the inherent fairness of the pseudo random scheduler 612 to reallocate the unused capacity to links that have traffic. In the embodiments herein, two mechanisms are used to achieve fair reallocation of unused capacity: initiation time point reduction and extension of previous communication period.

In the initiation time point reduction method, a device monitors its internal schedule 620 and traffic on the link. If there is no traffic, the schedule is modified by removal of initiation time points. The schedule is modified so that there is only a fraction of the original time points remaining. For example, in one possible implementation initiation time points may be removed so that only every fourth of the original time points are used. This effectively removes the connection to a device for a short intervals and allows its capacity to be used by other intersystem links. A negotiation process between a device pair is used to modify the schedule and remove time points.

In the method where previous communication periods are extended, a device will re-establish communication with the device that it previously communicated with when the current communication period is terminated early (i.e., terminations that occur before the next initiation time point). In this way it extends the previous communication period and effectively removes the device that has not fully used its scheduled capacity.

In principle, opportunistic allocation attempts to maximize the number of parallel communication transfers. To achieve opportunistic allocation, additional processes are performed. In this process a device 102 monitors the traffic pending for each link and the likelihood that a device is available to establish communication. This information may be derived from the signaling that occurred when the previous communication period was terminated for each of its intersystem links. The device 102 may then attempt to establish communication with another device that both has data pending to transfer and is likely to be available. If more than one device meets the criteria, the last one communicated with may be selected. These rules improve the likelihood that both devices will attempt to establish a connection with each other.

Some applications have very rigid communication requirements that may not be met with the pseudo random intersystem scheduler 612. These requirements are typically expressed in terms of fixed data bit rate and maximum latency. Furthermore, the application will typically negotiate the capability needed when establishing a channel for the service. The service will only be provided if sufficient capacity is available.

To accommodate more rigid requirements, a method to support resource reserved channels (RRC) is provided. The resource reserved channel type may be implemented as scheduled communication with a fixed period and duty cycle. Traffic for a resource reserved channel has higher priority than the pseudo random scheduled (PRS) channel so that it replaces the PRS traffic when a schedule conflict occurs. The PRS schedule is modified to accommodate any RRC traffic. In current design, resource reserved channels are negotiated such that they do not conflict with each other.

Because of the periodic characteristic of the resource reserved channel, in many cases it will use a fixed capacity of the communication link. Because of the periodic characteristic, the capacity taken from the PRS traffic is randomly distributed among all links. As a result, the intersystem traffic that is scheduled by the PRS method is still fairly allocated between intersystem connections although reduced by the RRC.

Figure 7:
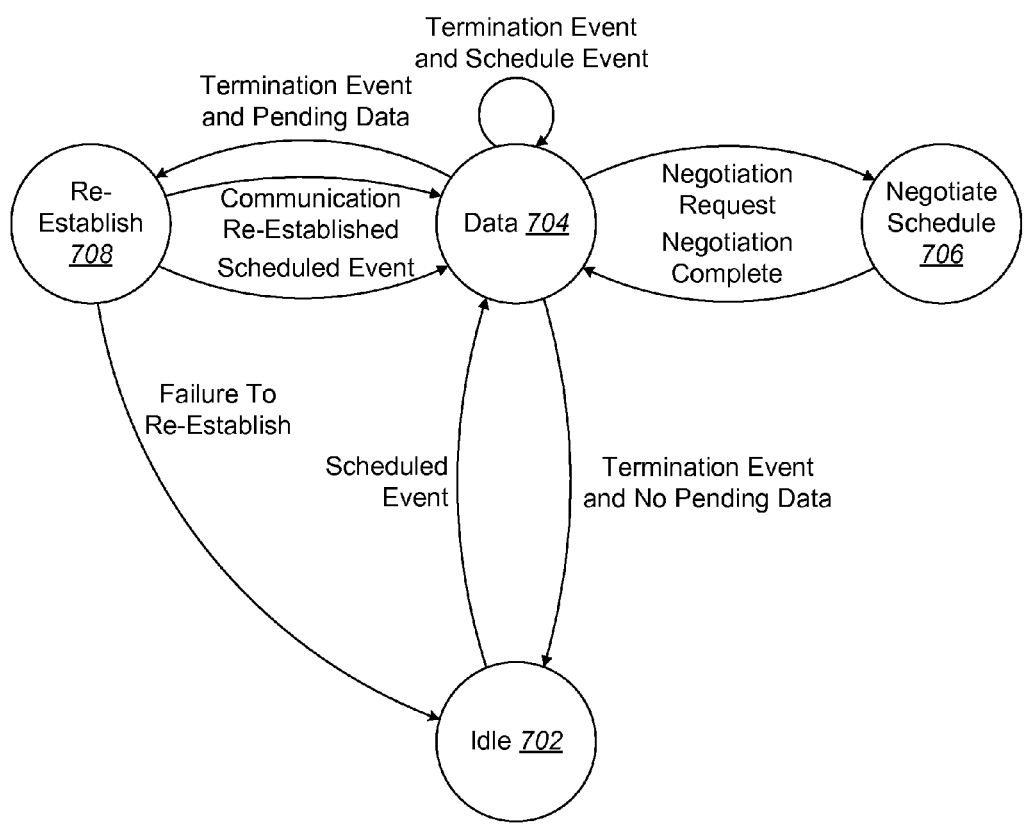
FIG. 7 is a state machine diagram illustrating an embodiment of a state machine for the scheduler of a device.

FIG. 7 illustrates an embodiment of a state machine for the scheduler of a device 102. Each device 102 may implement this state machine to implement a scheduler and to support other related functions. The system description as it relates to the state machine may apply to a MAC/baseband entity responsible for managing the intersystem traffic for the device 102. The information is equally applicable to both devices of the device pair unless otherwise stated. The protocol is based largely on master/slave access mechanisms. The Bluetooth standards use master/slave relationships. For clarity and to illustrate an example of how the state machine may be used, the protocol is described in master/slave and sometimes Bluetooth terminology. Of course, it will be appreciated by those skilled in the art that the inventive principles and embodiments herein may be applied to a wide range of electronic devices 102 configured for electronic communications with other devices.

The idle state 702 is illustrated in FIG. 7. In the idle state 702, there is no PRS intersystem traffic. The device 102 is free to communicate with other devices in its system or network. The device 102 may be designed to avoid communication that may extend into a PRS scheduled intersystem communication period. For a Bluetooth system, this can occur if a long packet is received that extends past a scheduled time point.

The data state 704 is also illustrated in FIG. 7. In the data state 704, data is exchanged between intersystem devices. Communication continues until a termination event occurs.

FIG. 7 also illustrates the negotiate schedule state 706. This state 706 is used to modify the schedule. Either device may initiate this process 706 or state 706. This state 706 is effectively a sub-state of the data state 704 because an active communication period is needed to support the exchange of messages needed for the negotiation of schedule.

The re-establish state 708 is also illustrated in FIG. 7. The re-establish state 708 implements a procedure for establishing communication during periods when there is no scheduled communication. This mechanism is used to distribute unused capacity to intersystem channels that have data available for exchange.

FIG. 7 also illustrates events that may cause a transition from one state to another or that may cause the device 102 to stay in the same state. The intersystem schedule manager (not shown) maintains a list of communication events for each intersystem channel in the schedule 620. The event list may include an ordered list of scheduled initiation time points 624 and corresponding channel identifiers 628. The scheduled event occurs when the current time matches the scheduled time. When an initiation time point occurs the device 102 will enter the data state 704 and begin communication with the corresponding device. If the device was currently active with another communication channel it will perform the forced termination process on that channel before entering the data state 704.

There are a number of different types of termination events that may occur. A forced termination occurs when there is a data exchange pending but one of the devices wishes to terminate the current communication period. A device may wish to do this because of another scheduled intersystem communication (or an interpiconet communication in a Bluetooth network) or for other reasons. The device terminates the communication period by asserting an indication of this event in a message to the other device.

Another type of termination event is a scheduled termination. If the negotiate schedule process 706 or state 706 was successfully completed, a termination time point was agreed upon for the current communication period. A scheduled termination event occurs when this time point occurs.

A data depleted event is another type of termination event. This event occurs when all the available data has been transferred by both devices. This is signaled to the other device by a message indicating this event. A master device signals to the other device that it has no data to transmit by transmitting a Poll Packet. The slave indicates that it has no data by transmission of a null packet. Thus, the data depleted termination event occurs when both devices indicate that they have no data to transfer.

Another type of termination event is a non-responsive termination event. A non-responsive termination event occurs when communication is scheduled but does not happen. A device may wait for communication for a fixed period. If no data is received, the communication period may be terminated. If the device is a master, the non-responsive termination event occurs when it does not receive a response to any packets transmitted to the slave device. If the device is a slave, the non-responsive termination event occurs when it does not receive any packets from the master. If the embodiment is being used with a Bluetooth network, this situation may occur when there is a scatternet scheduling violation. It can also occur when a device has a higher priority activity and cannot meet its agreed schedule. This will occur typically for processes that have indeterminate duration (e.g., page response, inquiry response).

Other types of events are also shown in FIG. 7 and further illustrate other events that may cause a change in state. A negotiate request event is used by a device to initiate a negotiate schedule process 706. This occurs during the active communication period between the two devices.

The pending data event or status is an indication of the composite status of all the intersystem links as seen by a device. If any of the links were left in a state where data is remaining to be transferred this indicator may be true. The state is known from the way in which a communication period is terminated. For a link where the data depleted event occurs this indicator may be false. For a link where a forced termination or a non-responsive termination occurs this indicator is true.

The no pending data event or status is also an indication of the composite status of all the intersystem links as seen by a device. This indicates that none of a device's intersystem links have data pending.

The communication re-established event is also illustrated in FIG. 7. This event occurs when a poll response sequence has been completed validating that a communication channel has been established. The failure to re-establish event indicates that the device was not able to establish communication in the re-establishment process 708.

As stated above, the idle state 702 is entered whenever there is no active PRS intersystem communication. The amount of time spent in the idle state 702 is dependent on intersystem traffic load and on any modification made to the pseudo randomly determined interpiconet (more generally intersystem) schedule. A device may modify the intersystem schedule to free time for the idle state 702 if needed for in-system links or other activities. The idle state 702 may imply that the device is idle with respect to PRS intersystem traffic, but the device may be active with other in-system communication activities.

While a device is in the idle state 702, it typically monitors the intersystem schedule and changes states when defined by the schedule. All other communication activities should be scheduled so that they will not conflict with the intersystem schedule.

Referring to the data state 704 as shown in FIG. 7, intersystem communication starts when a scheduled initiation event occurs or when the re-establishment procedure 708 has been successful. The scheduled initiation event is typically a time point defined by the pseudo-random scheduler or may be another initiation time point that was previously negotiated between the devices. A communication period consists of the exchange of data between a device pair until a termination event.

In the data state 704 the master transmits packets to the slave. Data packets are sent if available, otherwise poll packets are sent. This may be done until a termination event occurs. The slave may listen for the master transmitted packets. If packets from the master are received the slave transmits data packets if available and null packets otherwise.

A device detects a non-responsive condition by monitoring communication activity. If there is no communication for a non-responsive timeout period slots, the device may terminate communication. For the master device, it may transmit packets continuously to the slave device until the non-responsive timeout period expires. For the slave device, it may listen continuously for packets from the master. If the slave has not received any packets for the non-responsive timeout period, it may terminate the connection.

A device may terminate an active communication period at any time. Typically, a device will terminate the communication because it needs to perform another scheduled event. For example, the device may need to be available for an initiation time point for another link, it may need to communicate with a slave on an in-system link, etc.

A forced termination may be signaled by a device through a variety of ways. Depending upon the types of devices, systems, protocols, etc., that are being used, different techniques may be implemented by a device to signal a forced termination. Generally, a device may send a forced termination message to other devices to communicate a forced termination. Those skilled in the art will appreciate the many different ways in which this message may be communicated. For example, in a Bluetooth system, the forced termination may be signaled by a device with the flow bit of the packet header. The flow bit is normally enabled (FLOW=1) during the exchange of data. The device may clear it (FLOW=0) to force the termination of the current communication period.

A forced termination may also be preceded by a negotiate schedule process 706. If used, it may indicate that the device that initiated the new schedule is not available until the new negotiated time. This may imply that this device is not available on this link for any re-establishment. The negotiate schedule state 706 or process 706 may be used by the device that is terminating the active communication and is aware that it will be busy in the near future. If the forced termination is not used, it may imply that the device is likely to be free for re-establishment of this link.

A data depleted termination occurs when both devices have no data to exchange. This happens when both devices empty their data queues. Similar to a forced termination, a data depleted termination may be signaled by a device through a variety of ways depending upon the types of devices, systems, protocols, etc., that are being used. Generally, a device may send a data depleted termination message to other devices to communicate a data depleted termination.

Those skilled in the art will appreciate the many different ways in which the data depleted termination message may be communicated. For example, in a Bluetooth system, this event may be signaled when the slave transmits a Null packet and the master transmits a Poll or Null packet. The termination slot is determined based on the last device to signal that is has no data to transmit. The sequence Poll-Null-Poll with the ACKN=0 may be used when the master is the last to run out of data. The last slot used is the Poll packet sent by the master. The sequence Null-Poll-Null with ACKN=0 may be used when the slave is the last device to run out of data. In this case the Null packet from the slave is the last slot to be used.

The schedule termination may occur if a negotiate schedule process 706 was completed during the current active communication period. As part of this process, the beginning of the hold period (hold instant) was negotiated. The hold instant defines the last slave slot during this communication period.

As stated above, the negotiate schedule state 706 or process 706 is used to modify the schedule. A device may choose to modify the schedule for any number of reasons (e.g. conflict avoidance, etc). The device modifies its schedule to avoid wasting bandwidth by informing the other device that it cannot meet the obligation of current schedule. A new schedule is then negotiated that is acceptable to both devices.

The negotiate schedule state 706 or process 706 may be used in several situations. The negotiate schedule state 706 may be used when there are initiation time point event conflicts. In this situation, a device may look ahead at the next time point for the current active communication link, if the next time point conflicts with a time point for another intersystem link and the other link has a higher priority, the negotiate schedule process 706 may be used to negotiate a new time point.

The negotiate schedule state 706 may be used when there is a communication termination with no opportunity for re-establishment. This may happen if the communication period is going to be terminated by the local device and the link has pending traffic. The local device may look ahead at its predicted availability. If the device is expected to be busy, it may use this procedure to indicate that it is not available by asserting the initiation time point. This information is used by the re-establishment process 708 of the peer device in its selection of communication links.

The negotiate schedule state 706 may be used when other events occur. For example, if the communication capability of the device is needed for other purposes, the device may make itself available by negotiating inactive periods in the intersystem schedule. This may be done for each intersystem link.

The negotiate schedule state 706 or process 706 may be initiated by the device that wishes to modify the current schedule. Different techniques may be used by a device to initiate a negotiate schedule process. Generally, a device may send a negotiate schedule initiation message to other devices to initiate a negotiate schedule process 706. Those skilled in the art will appreciate the many different ways in which this message may be communicated. For example, in a Bluetooth system, the state may begin by transmission of an LMP_hold_req message where the hold instant parameter is set to equal the last slot of the communication period as determined by the initiation time point for any other connections. The hold time parameter may be set to correspond to the proposed next initiation time point for the connection. The receiving device may compare the requested hold instant to the next time point event that it has in its scheduled and accept it if it is less. Otherwise the device may request a new hold instant that corresponds to its next scheduled event. In current design, the embodiments are configured to attempt to agree on the shorter of the two periods. The receiving device may also inspect the hold time parameter and accept this parameter if it is able to meet that time. If not, it can propose the next initiation point for the channel. If both parameters are acceptable, it may send an LMP_Accepted. Otherwise it may transmit an LMP_hold_req with alternate requests. The receiving device may perform similar checks and respond in the same way. After the negotiation is complete, the state may return to the Data state 704 and continue exchange of information until the termination event occurs.

The re-establishment state 708 attempts to opportunistically establish communication during periods that are not being used. The algorithm is presently designed to initially fairly distribute unused capacity between devices when possible and to then opportunistically distribute communication capacity where possible.

A device may enter into the re-establishment state 708 when the current communication has been terminated and there is data pending on any of its intersystem communication links. The device may attempt to re-establish communications on the previous active connection that has data transmission pending where the remote device has indicated that it may be available. If the device is a master, this may consist of the transmission of packets (Poll or data) until a response is received or another initiation time point occurs. If a slave, it may listen until another initiation time point occurs. If a response is received the device may transition into the data state.

In the case where the device that terminated the communication period signaled that it will be busy, the free device may attempt to establish communication with another device that is likely to be available.

Each device may maintain a schedule 620 and state information 632 for each intersystem communication channel. The schedule 620 may consist of an ordered list of time points. Each time point may be generated from the pseudo random sequence for the corresponding connection plus any negotiated modifications or additions. The device may combine the lists to determine which connections are scheduled at any point in time.

For each intersystem link status information 634 may be maintained. This information may be derived from the termination event plus any internal data queue knowledge.

Each device may include link status information. The link status information may include data pending 630 information, such as pending/no pending data. This may indicate if there is any pending transmission on the link. This is set if there is any data pending transmission in the local queue or if the previous communication period was terminated with a data transmission pending event.

A device may also include a remote capacity indicator (not shown). This may indicate whether the remote device on a link is currently busy or free. This indicator may be set to free if the previous communication period was not terminated with a negotiate schedule event. Using the negotiate schedule process implies that the remote device is busy until the new negotiated time.

Link schedule information (not shown) may also be stored on the device. Link schedule information may include pseudo random time points. These time points may be automatically generated based on an algorithm that defines their position relative to the clock of the master device on the link. These time points may also define the initiation of communication.

Scheduled time points may also be stored. These time points may be created through a negotiation process between the two devices connected by this link. These time points define the initiation of communication. A device may also store termination time points. These are time points that define when communication should be terminated. They are created in the negotiate schedule process 706.

Because initiation time points are typically generated pseudo randomly, conflicting time points may occur for devices that have two or more intersystem links. The occurrence may be random with a rate dependent on the density of time points. In embodiments disclosed herein, a device detects the conflicting time points and adjusts the schedule to eliminate them. The device may use the negotiate schedule state 706 or process 706 to move or skip conflicting time points when possible. When it is not possible to reschedule conflicting initiation time points, the device should select communication with the device with the longest inactive period over other devices. This assures a fair allocation of bandwidth and minimizes inactive periods.

A pseudo random generator may be used to create the initiation time points that make up the schedule. Time points may be defined with reference to the clock of the master device of the device pair that make-up the intersystem connection. In current design, both devices are able to independently create the schedule and both have knowledge of the clock needed to utilize the schedule. Given that each schedule may be unique and random with respect to other intersystem schedules, a unique but shared piece of information may be used as input to the generator. For example, if the devices were part of a Bluetooth network, this shared piece of information may be the Bluetooth device address (BD_ADDR) of the master and active member address (AM_ADDR) of the slave.

One characteristic of the generator is its density, which defines the average time between time points. Other temporal relations may also be imposed on the generation function to achieve particular operating characteristics. Three possible methods and related characteristics are described below. The following methods may be used but each has its own unique system limitations and performance tradeoffs. Those skilled in the art will appreciate that other methods may also be used with embodiments of devices and device software to effect scheduling of communication periods.

Figure 8A:
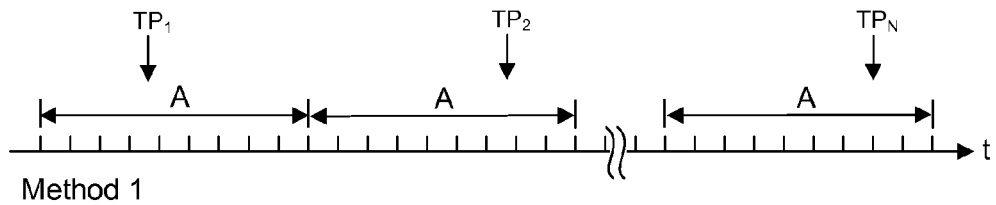
FIG. 8A is a timing diagram illustrating a predetermined synchronized method for generating time points.

FIG. 8A illustrates a predetermined synchronized method for generating time points. As shown, in the predetermined synchronized time method time points are generated by first breaking the schedule into fixed period intervals (A). The duration of the intervals corresponds to the density of time points desired. A single time point is placed within the interval at a random location. Following is an equation that described how a time point is generated using this method.

$TP_N = A \times N + \text{Rand}(0 \ldots A)$

In the foregoing equation, A defines the interval size, and N is the interval number and index to the time point. The function Rand( ) provides a random number in the range of 0 to A. A unique random number is generated for each time point.

This predetermined synchronized method has the advantage that the range of communication period lengths can be influenced by the distribution of the time point positions. Different distributions of random numbers can be used to control the statistical characteristics of the communication period length. Typically a uniform distribution of random number would be used. But, for example, to achieve a communication period duration more narrowly distributed around the mean a normal distribution of random numbers centered at A/2 may be used. This would reduce the variation in communication period length but increase the probability of collisions when compared to a uniform distribution.

This method is primarily applicable to systems where the interval is synchronized between intersystem links. It has the advantage of providing a tighter bound on the maximum delay between communication periods and may better control the statistical distribution of the communication period duration.

Figure 8B:
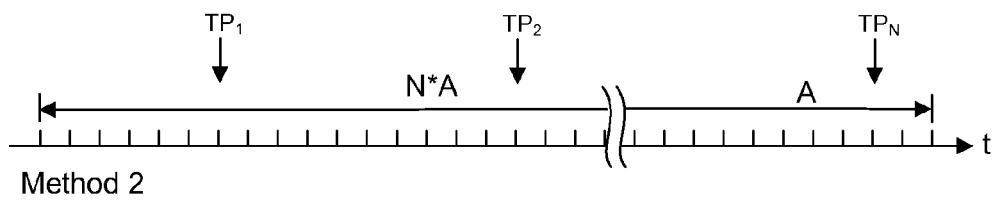
FIG. 8B is a timing diagram illustrating a predetermined asynchronous method for generating time points.

FIG. 8B illustrates a predetermined asynchronized method for generating time points. As shown, in this method of generation time point positions are determined by random number generation over an arbitrary long time. This period is typically many times greater than the density. Typically, this should be 10 to 100 times greater that the average period between time points. Time points are generated randomly with uniform distribution in this period. The time points are then sorted into ascending order for usage by the scheduler.

$TP_{0 \ldots M} = \text{Rand}(0 \ldots A*N)$ $TP_{0 \ldots N} = \text{Sort}(TP_{0 \ldots M})$ In the foregoing equation, $TP_{0 \ldots N}$ is the ordered list of time points used by the scheduler. The Rand( ) function generates time points that are uniformly distributed over the period defined by the density (A) and number of time points needed (N). The total duration that the random numbers are uniformly generated in is determined by the product of the density (A) required and the number of time points (N).

The predetermined asynchronized method has the advantage that there is no synchronization needed between clocks of different intersystem links. Its primary disadvantage when compared to the predetermined synchronized method is that the characteristics of the communication period are not bounded. The communication period length and time between communication periods is more variable.

Figure 8C:
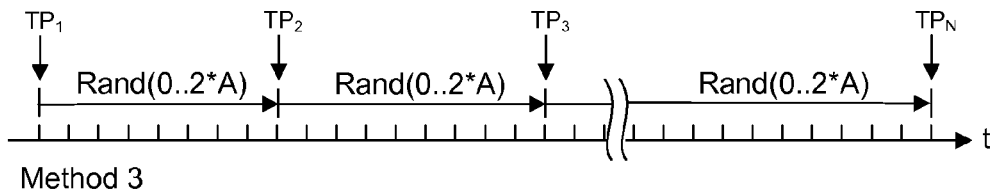
FIG. 8C is a timing diagram illustrating a real-time method for generating time points.

FIG. 8C illustrates a real-time method for generating time points. In the real-time method, time points are generated relative to previous time points. This is primarily applicable to the case where it is desirable to generate the schedule in real-time although it can also be used to predetermine a schedule. To perform the real-time method, a device may generate a random number with uniform distribution in the range between 0 and 2 times the density. This number is added to the previous initiation time point to determine the next initiation time point. This information to transferred to the other device. This process is carried out by one of the devices in the device pair, typically the master. This method is particularly applicable to Hold mode in the Bluetooth System.

The intersystem scheduler allows Resource Reserved Channel (RRC) traffic to coexist with Pseudo Random Scheduled (PRS) intersystem traffic. The embodiments described herein allow this coexistence while maintaining the fair performance characteristics of the best effort channel (BEC) provided by the pseudo random scheduler. Two mechanisms are defined to manage the coexistence of the RRC channel types on top of the BEC channel: the traffic overlay method and the dynamic schedule modification method.

The traffic overlay method is used when the active period of the Resource Reserved traffic is relatively short compared to the PRS average communication period. If the active period is less than the non-responsive termination event timeout threshold, a device is allowed to provide this channel without modifying the intersystem schedule. In this case, the device will simply transmit the RRC traffic in place on the PRS traffic. After completion it will return to the PRS scheduled traffic. If the device is nearing the end of the communication period it will terminate the communication early and then proceed with the RRC traffic.

The schedule modification method is used when the active period of the RRC traffic is long relative to the average communication period length or if it is longer than the non-responsive termination event threshold of the PRS scheduled traffic. In this case, the PRS schedule is modified to free time for this traffic. This occurs in the communication period prior to the period for the RRC traffic.

To accommodate in-system data traffic a device must have time available to service it. This free time corresponds to the idle state 702 in the intersystem state machine. A device may use the free time that naturally occurs in the intersystem scheduled traffic or choose to modify the intersystem schedule to make free time available. In the latter case the device can make free time in the intersystem traffic by re-negotiating the intersystem schedule. This is equivalent to the process that is used to manage resource reserved channels. Typically this would be done periodically to meet requirements for in-system communication.

A device may also choose to treat an in-system link as if it is an intersystem link. In this case it may use a PRS schedule for the in-system link and get the same performance characteristics as an intersystem link. The method used may be dependent on the timing requirements of the in-system communication.

Figure 9A:
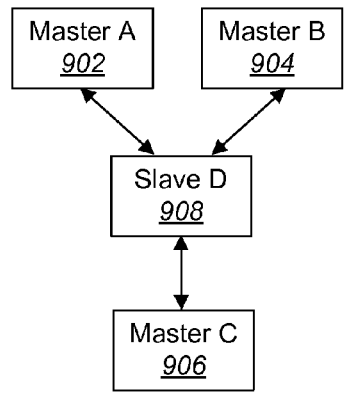
FIG. 9A is a block diagram of a device network including three master devices.
Figure 9B:
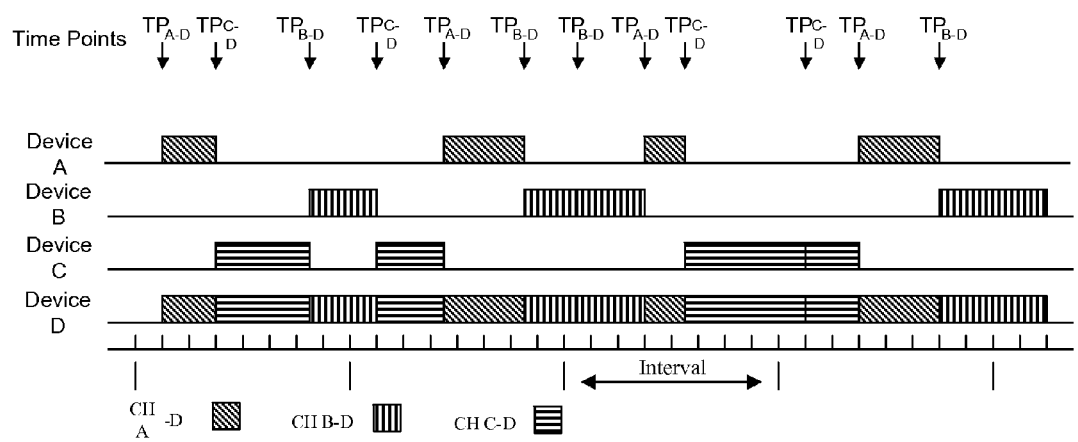
FIG. 9B is a communication period diagram for the embodiment of FIG. 9A.

FIGS. 9A and 9B illustrate a device network configuration and the unique pseudo-random schedule generated for each connection. As shown in FIG. 9A, the device network includes three masters 902, 904, 906 and one slave 908. In a Bluetooth system, the configuration shown in FIG. 9A makes up three piconets (one master for each piconet).

The communication periods diagram of FIG. 9B illustrates several intervals. As shown, the density used enables an average of one communication period per interval. As discussed above, a communication period starts with an initiation time point and it ends when a conflicting time point occurs or with a termination time point.

Figure 10A:
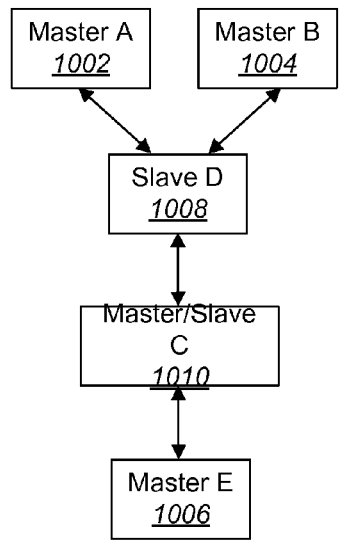
FIG. 10A is a block diagram of a device network including three master devices, one slave device, and one master/slave device.
Figure 10B:
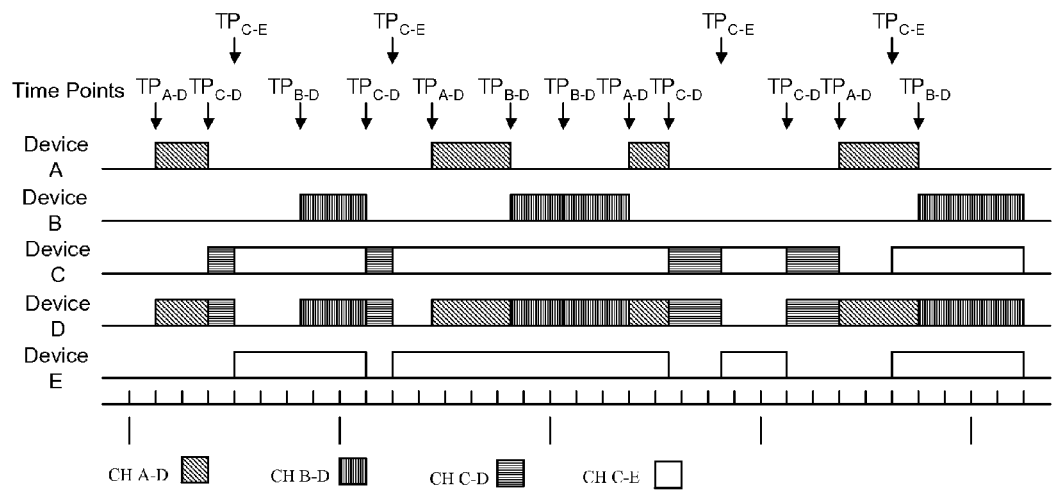
FIG. 10B is a communication period diagram for the embodiment of FIG. 10A.

FIGS. 10A and 10B illustrate a device network configuration including four piconets. As shown in FIG. 9A, the device network includes three masters 1002, 1004, 1006, one slave 1008, and one master/slave 1010. The communication periods diagram of FIG. 10B illustrates a minimum capacity allocated to each connection. As discussed herein, dynamic allocation may be used to recover unused capacity.

Figure 11A:
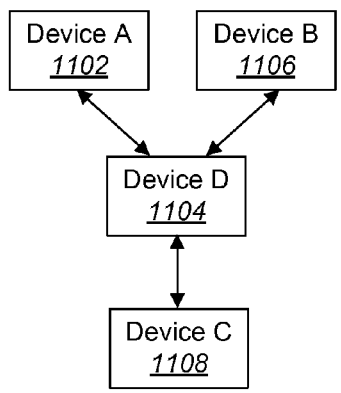
FIG. 11A is a block diagram of a device network.
Figure 11B:
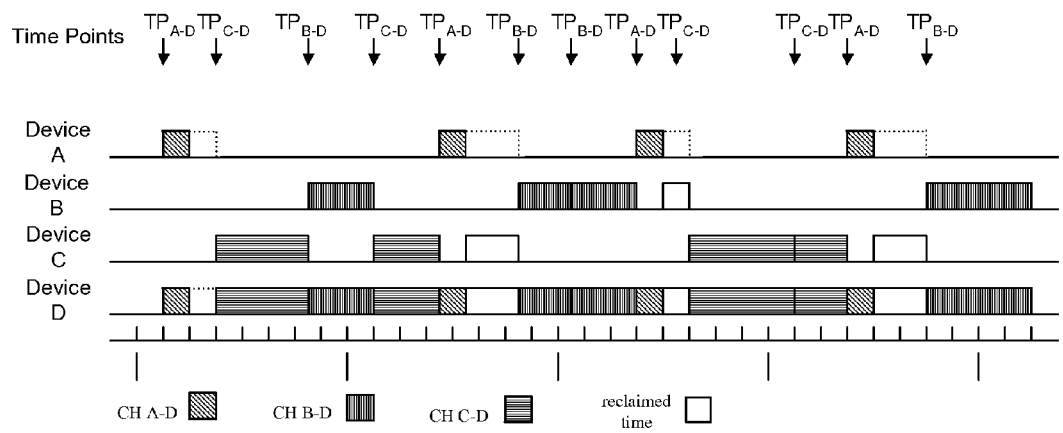
FIG. 11B is a communication period diagram for the embodiment of FIG. 11A.

FIGS. 11A and 11B illustrate fair allocation of unused capacity by a device network. In this example, there was no traffic between device A 1102 and device D 1104. As a result, the original communication periods for the device A 1102—device D 1104 pair were unused capacity. For the example of FIGS. 11A and 11B, also assume that full capacity was being used between devices B 1106 and D 1104 and between devices C 1108 and D 1104. In fair allocation, the unused capacity of the device A 1102—device D 1104 pair is randomly used by either the device B 1106—device D 1104 pair or by the device C 1108—device D 1104 pair. In a Bluetooth system, this would effectively make device A 1102 appear to be absent from the scatternet.

Figure 12A:
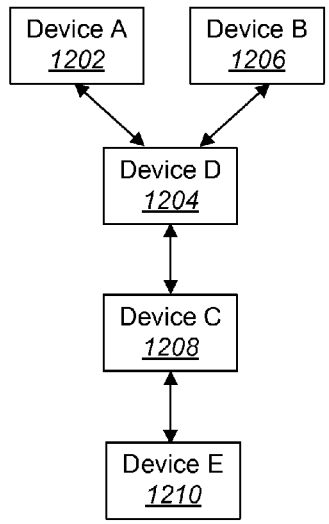
FIG. 12A is a block diagram of a device network.
Figure 12B:
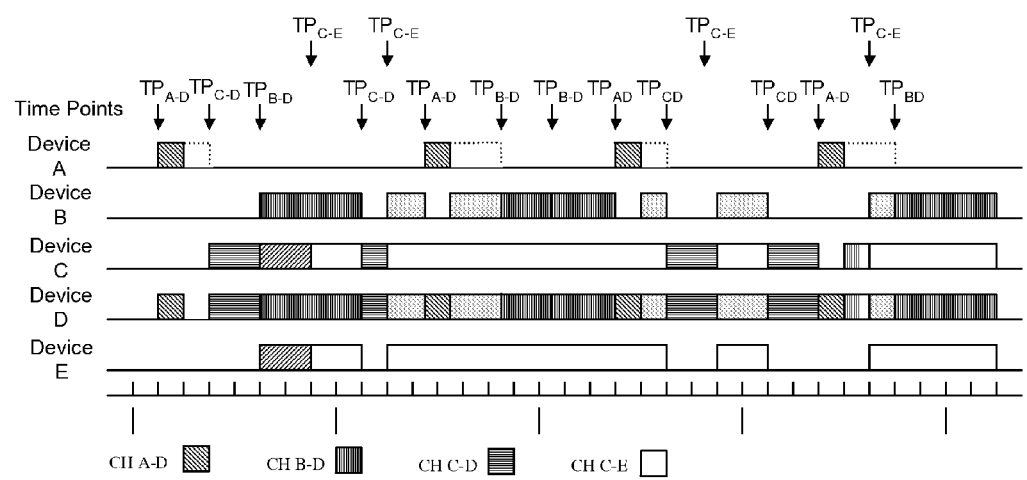
FIG. 12B is a communication period diagram for the embodiment of FIG. 12A.

FIGS. 12A and 12B illustrate opportunistic and fair allocation of unused capacity by a device network. In this example, there was no traffic between device A 1202 and device D 1204. As a result, the original communication periods for the device A 1202—device D 1204 pair were unused capacity. For the example of FIGS. 12A and 12B, also assume that full capacity was being used between devices B 1206 and D 1204, between devices C 1208 and D 1204, and between devices E 1210 and C 1208. With fair allocation, a terminating event caused by a device that is not active causes the free device to remain on the same channel and to attempt reestablishment. With opportunistic allocation, a terminating event caused by an active busy channel causes the free device to switch to an alternate channel. Thus, opportunistic allocation allows more parallel exchange of data. As shown in the communication periods diagram of FIG. 12B, the unused capacity of the device A 1202—D 1204 pair is fairly allocated and opportunistically allocated to other channels to use the capacity.

Figure 13:
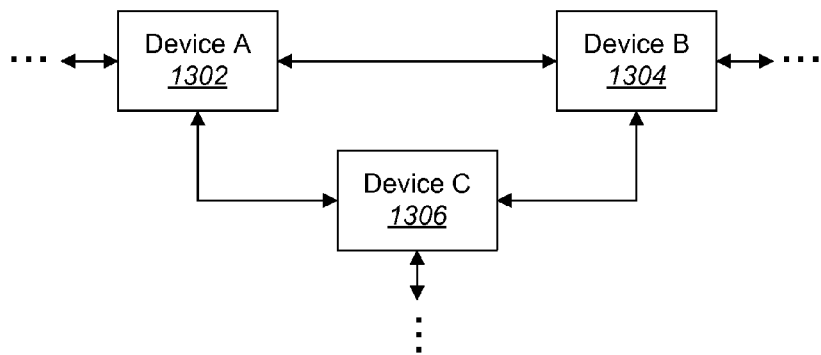
FIG. 13 illustrates a plurality of electronic devices that are in electronic communication with one another.

FIG. 13 illustrates a plurality of electronic devices that are in electronic communication with one another. In particular, three electronic devices are shown in FIG. 13: device A 1302, device B 1304, and device C 1306. These electronic devices 1302, 1304, 1306 may be included in one or more device networks.

Figure 13A:
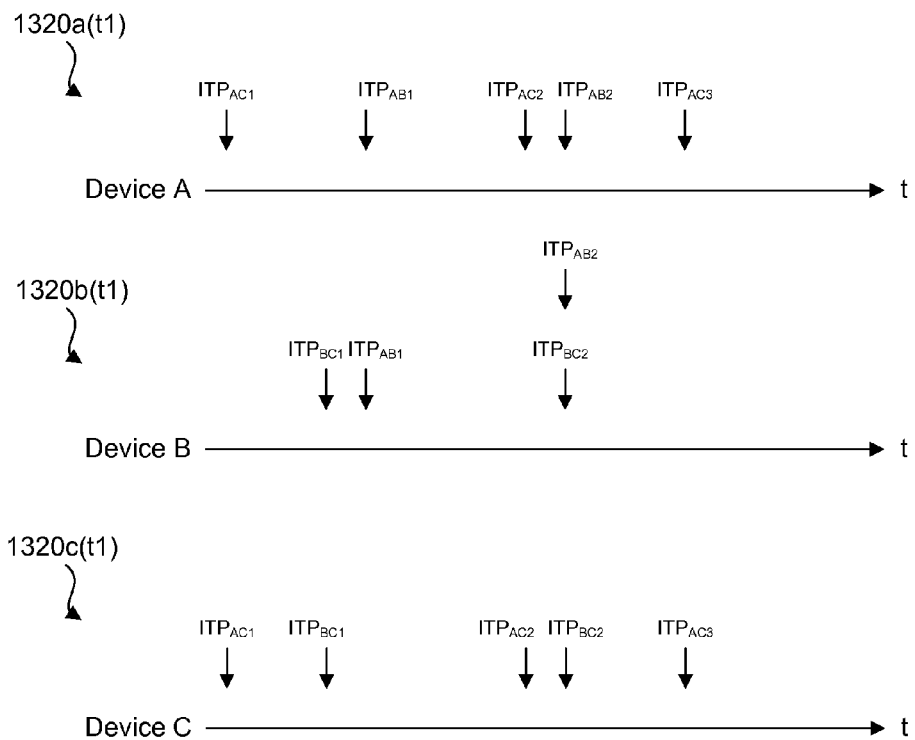
FIG. 13A illustrates exemplary communication schedules for the electronic devices shown in FIG. 3A.

FIG. 13A illustrates exemplary communication schedules 1320 for the electronic devices 1302, 1304, 1306 shown in FIG. 13. In particular, an exemplary communication schedule 1320*a* is shown for device A 1302, an exemplary communication schedule 1320*b* is shown for device B 1304, and an exemplary communication schedule 1320*c* is shown for device C 1306. In FIG. 13A, the communication schedules 1320 are shown at a first point in time, which will be referred to as $t_1$. The communication schedule 1320*a* for device A 1302 at time $t_1$ is labeled 1320*a*($t_1$), the communication schedule 1320*b* for device B 1304 at time $t_1$ is labeled 1320*b*($t_1$), and the communication schedule 1320*c* for device C 1306 at time $t_1$ is labeled 1320*c*($t_1$).

As described previously, a communication schedule 1320 may include one or more scheduled communication periods 112. The communication schedule 1320*a*($t_1$) for device A 1302 includes three scheduled communication periods 112 involving device A 1302 and device C 1306 ($AC_1$, $AC_2$, and $AC_3$), and two scheduled communication periods 112 involving device A 1302 and device B 1304 ($AB_1$ and $AB_2$). The communication schedule 1320*b*($t_1$) for device B 1304 includes two scheduled communication periods 112 involving device A 1302 and device B 1304 ($AB_1$ and $AB_2$), and two scheduled communication periods 112 involving device B 1304 and device C 1306 ($BC_1$ and $BC_2$). The communication schedule 1320*c*($t_1$) for device C 1306 includes three scheduled communication periods 112 involving device A 304 and device C 306 ($AC_1$, $AC_2$, and $AC_3$), and two scheduled communication periods 112 involving device B 1304 and device C 1306 ($BC_1$ and $BC_2$).

As described previously, each scheduled communication period 112 may include an initiation time point 114 that defines the beginning of a communication period 112. The initiation time points 114 shown in FIG. 13A are labeled according to the communication period 112 to which they correspond. For example, the initiation time point 114 labeled $ITP_{AB1}$ refers to the initiation time point 114 that defines the beginning of the $AB_1$ communication period 112, the initiation time point 114 labeled $ITP_{BC2}$ refers to the initiation time point 114 that defines the beginning of the $BC_2$ communication period 112, and so forth.

An electronic device 102 may itself generate the initiation time points 114 that are included in its communication schedule 1320. For example, device A 1302 may generate the initiation time points 114 that are included in the communication schedule 1320*a*($t_1$) for device A 1302, device B 1304 may generate the initiation time points 114 that are included in the communication schedule 1320*b*($t_1$) for device B 1304, and so forth.

Two electronic devices 102 may generate the same initiation time points 114 for communication periods 112 involving each other. For example, as shown in FIG. 13A, device A 1302 and device B 1304 have generated the same initiation time points 114 for communication periods 112 involving device A 1302 and device B 1304. That is, $ITP_{AB1}$ in the communication schedule 1320*a*($t_1$) for device A 1302 equals $ITP_{AB1}$ in the communication schedule 1320*b*($t_1$) for device B 1304, $ITP_{AB2}$ in the communication schedule 1320*a*($t_1$) for device A 1302 equals $ITP_{AB2}$ in the communication schedule 1320*b*($t_1$) for device B 1304, and so forth.

In some communication schedules 1320, two or more communication periods 112 may conflict with one another. For example, in the exemplary communication schedule 1320*b*($t_1$) for device B 1304, a conflict exists between the $BC_2$ and $AB_2$ communication periods 112. The $BC_2$ and $AB_2$ communication periods 112 conflict with one another because the initiation time point 114 for the $BC_2$ communication period 112 ($ITP_{BC2}$) is substantially equal to the initiation time point 114 for the $AB_2$ communication period 112 ($ITP_{AB2}$).

Figure 13B:
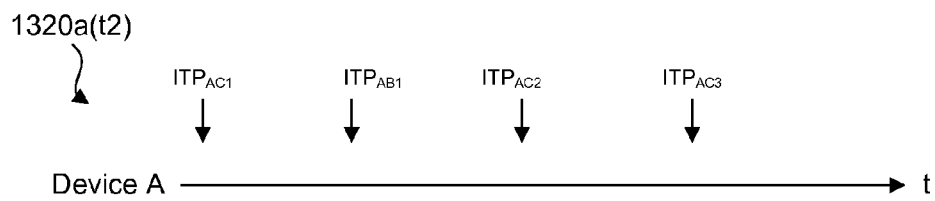
FIG. 13B illustrates the exemplary communication schedules of FIG. 13A after any conflicts in the communication schedules have been resolved.
Figure 13B:
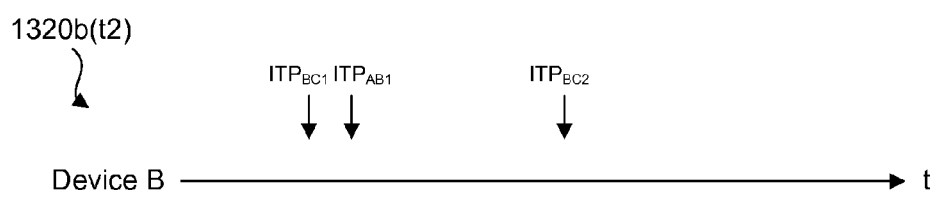
Figure 13B:
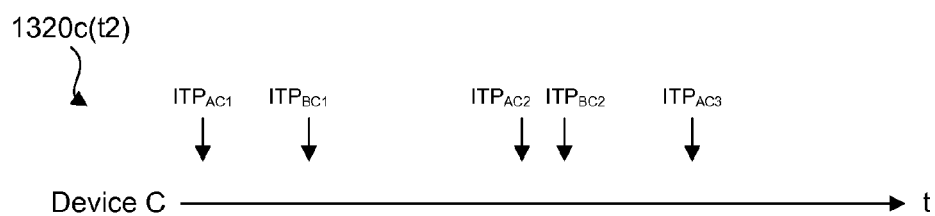

In some embodiments, it may be desirable to resolve some or all of the conflicts between communication periods 112 in a communication schedule 1320. FIG. 13B shows the communication schedules 1320 at a second point in time, which will be referred to as $t_2$ and which occurs after the first point in time $t_1$ described previously. The communication schedule 1320*a* for device A 1302 at time $t_2$ is labeled 1320*a*($t_2$), the communication schedule 1320*b* for device B 1304 at time $t_2$ is labeled 1320*b*($t_2$), and the communication schedule 1320*c* for device C 1306 at time $t_2$ is labeled 1320*c*($t_2$). In FIG. 13B, the conflicts in the communication schedules 1320*a*(t2), 1320*b*(t2), and 1320*c*(t2) have been removed.

Resolving a conflict between scheduled communication periods 112 may involve unscheduling one or more of the conflicting communication periods 112. For example, to resolve the conflict between the $BC_2$ and $AB_2$ communication periods 112 in the communication schedule 1320*b* for device B 1304, the $AB_2$ communication period 112 has been unscheduled. Those skilled in the art will recognize that the selection of the $AB_2$ communication period 112 is exemplary only; the conflict could also have been resolved by unscheduling the $BC_2$ communication period 112.

Unscheduling a communication period 112 may involve deleting the initiation time point 114 for the communication period 112 from each communication schedule 1320 that includes the scheduled communication period 112. For example, to unschedule the $AB_2$ communication period 112, the initiation time point 114 for the $AB_2$ communication period 112 has been deleted from the communication schedule 1320*a*($t_2$) for device A 1302 and the communication schedule 1320*b*($t_2$) for device B 1304.

An electronic device 102 may itself manage the resolution of any conflicts in its communication schedule 1320. This may involve unscheduling one or more communication periods 112 from its own communication schedule 1320, and then sending unschedule messages to one or more other electronic devices 102. For example, device B 1304 may manage the resolution of the conflict between the $BC_2$ and $AB_2$ communication periods 112. This may involve unscheduling the $AB_2$ communication period 112 from the communication schedule $1320b(t_2)$ for device B 1304, and then sending a message to device A 1302 instructing device A 1302 to unschedule the $AB_2$ communication period 112 from the communication schedule $1320a(t_2)$ for device A 1302.

Conflicts between scheduled communication periods 112 are not the only potentially undesirable characteristic in communication schedules 1320. Some communication schedules 1320 may include short communication periods 112. Typically, short communication periods 112 are not an efficient use of communication resources. Accordingly, it may be desirable to eliminate short communication periods 112 from communication schedules 1320.

Figure 13C:
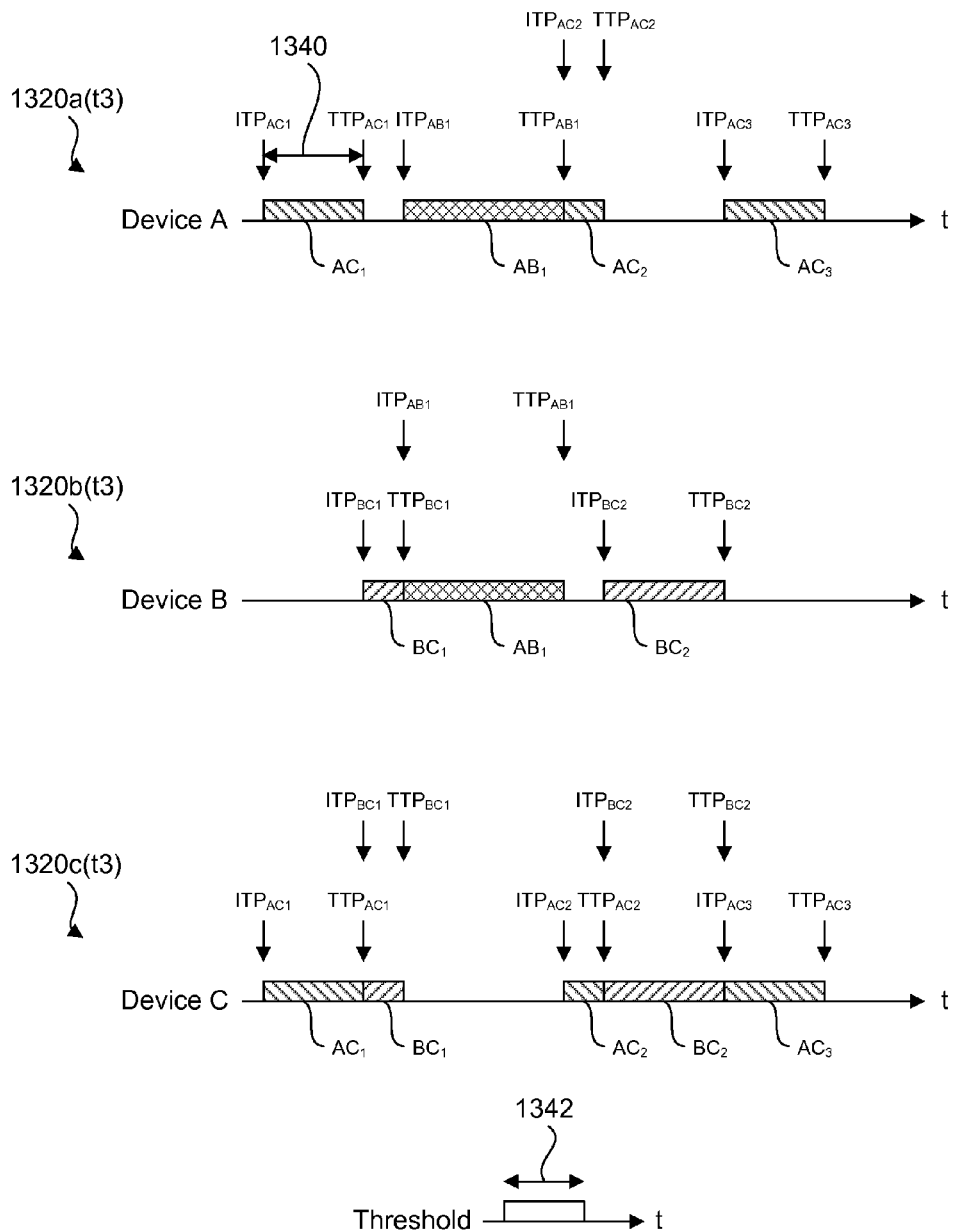
FIG. 13C illustrates the exemplary communication schedules of FIG. 13B after the duration of each scheduled communication period has been determined.

Eliminating short communication periods 112 from communication schedules 1320 may involve determining the duration 1340 of each scheduled communication period 112. FIG. 13C shows the communication schedules 1320 at a third point in time, which will be referred to as $t_3$ and which occurs after the second point in time $t_2$ described previously. The communication schedule 1320a for device A 1302 at time $t_3$ is labeled $1320a(t_3)$, the communication schedule 1320b for device B 1304 at time $t_3$ is labeled $1320b(t_3)$, and the communication schedule 1320c for device C 1306 at time $t_3$ is labeled $1320c(t_3)$. In the communication schedules $1320a(t_3)$, $1320b(t_3)$, and $1320c(t_3)$, the duration 1340 of each scheduled communication period 112 has been determined.

Determining the duration 1340 of a communication period 112 may involve determining a termination time point 116 for the communication period 112. Determining a termination time point 116 for a communication period 112 may involve a negotiation process between the two electronic devices 102 that are scheduled to be involved in the communication period 112. This negotiation process will be described in greater detail below. Alternatively, determining a termination time point 116 for a communication period 112 may involve generating a termination time point 116 at the same time that the initiation time point 114 for the communication period 112 is generated.

As shown, a termination time point 116 has been determined for each communication period 112 in each communication schedule $1320a(t3)$, $1320b(t3)$, and $1320c(t3)$ shown in FIG. 13C. Once a termination time point 116 for a communication period 112 has been determined, the duration 1340 of the communication period 112 may be determined by calculating the amount of time between the initiation time point 114 and the termination time point 116.

Eliminating short communication periods 112 from a communication schedule 1320 may involve comparing the duration 1340 of each communication period 112 in the schedule 1320 with a threshold duration 1342 that is associated with the schedule 1320. If a communication period 112 is shorter than the threshold duration 1342, the communication period 112 may be unscheduled. For example, a threshold duration 1342 is associated with the exemplary communication schedules $1320a(t3)$, $1320b(t3)$, and $1320c(t3)$ shown in FIG. 13C. The $BC_1$ and $AC_2$ communication periods 112 are both shorter than the threshold duration 1342. Thus, the $BC_1$ and $AC_2$ communication periods 112 may be unscheduled.

Figure 13D:
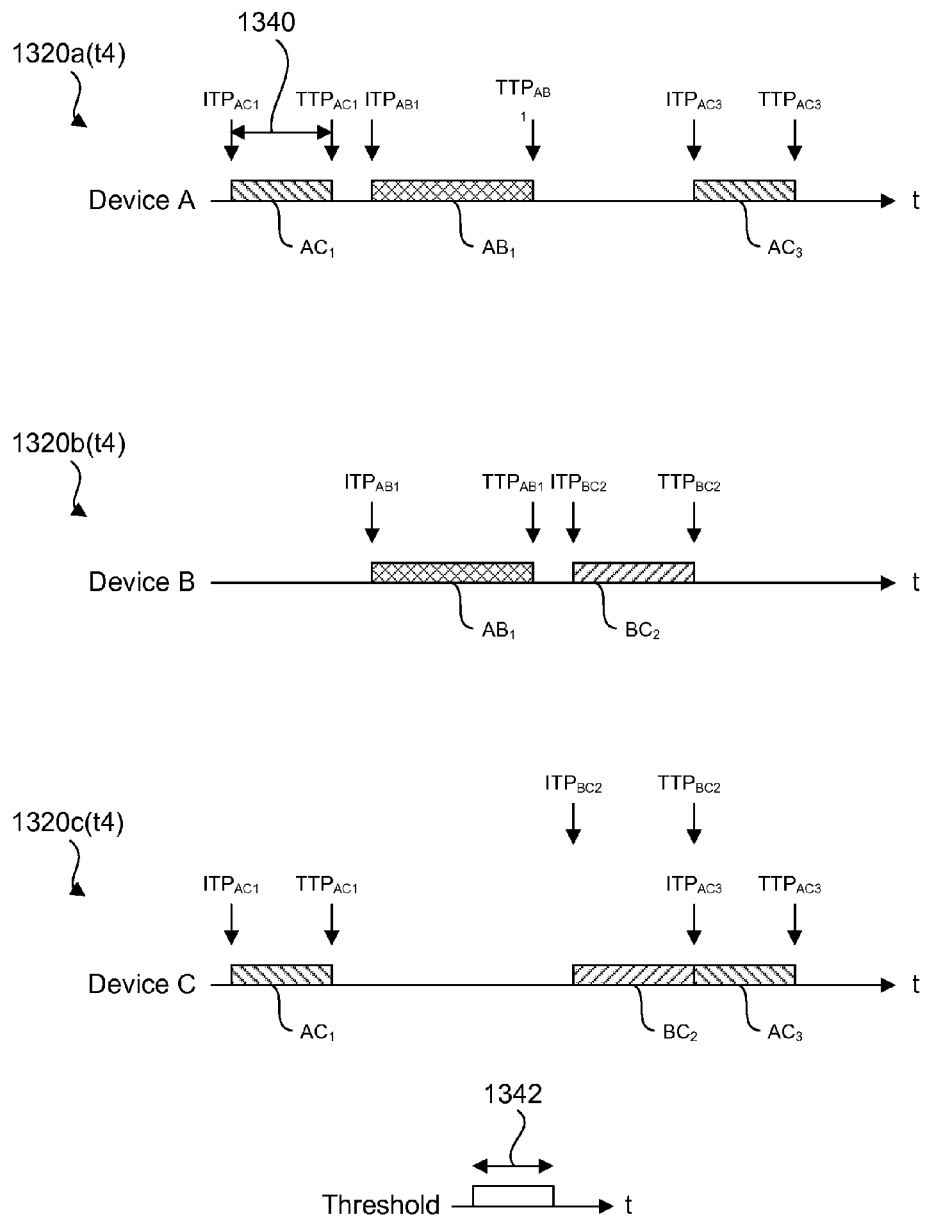
FIG. 13D illustrates the exemplary communication schedules of FIG. 13C after the short communication periods have been unscheduled.

FIG. 13D shows the communication schedules 1320 at a fourth point in time, which will be referred to as $t_4$ and which occurs after the third point in time $t_3$ described previously. The communication schedule 1320a for device A 1302 at time $t_4$ is labeled $1320a(t_4)$, the communication schedule 1320b for device B 1304 at time $t_4$ is labeled $1320b(t_4)$, and the communication schedule 1320c for device C 1306 at time $t_4$ is labeled $1320c(t_4)$. In the communication schedules $1320a(t_4)$, $1320b(t_4)$, and $1320c(t_4)$, the short communication periods 112 have been unscheduled. In particular, the $BC_1$ and $AC_2$ communication periods 112 have been unscheduled.

Unscheduling a communication period 112 may involve deleting the initiation time point 114 and the termination time point 116 for the communication period 112 from each communication schedule 1320 that includes the scheduled communication period 112. For example, to unschedule the $BC_1$ communication period 112, the initiation time point 114 and the termination time point 116 for the $BC_1$ communication period 112 have been deleted from the communication schedule $1320b(t_4)$ for device B 1304 and the communication schedule $1320c(t_4)$ for device C 1306. Similarly, to unschedule the $AC_2$ communication period 112, the initiation time point 114 and the termination time point 116 for the $AC_2$ communication period 112 have been deleted from the communication schedule $1320a(t_4)$ for device A 1302 and the communication schedule $1320c(t_4)$ for device C 1306.

An electronic device 102 may itself manage the elimination of short communication periods 112 from its communication schedule 1320. This may involve unscheduling one or more communication periods 112 from its own communication schedule 1320, and then sending unschedule messages to one or more other electronic devices 102. For example, device B 1304 may manage the elimination of the $BC_1$ communication period 112. This may involve unscheduling the $BC_1$ communication period 112 from the communication schedule $1320b(t_4)$ for device B 1304, and then sending a message to device C 1306 instructing device C 1306 to unschedule the $BC_1$ communication period 112 from the communication schedule $1320c(t_4)$ for device C 1306.

Figure 13E:
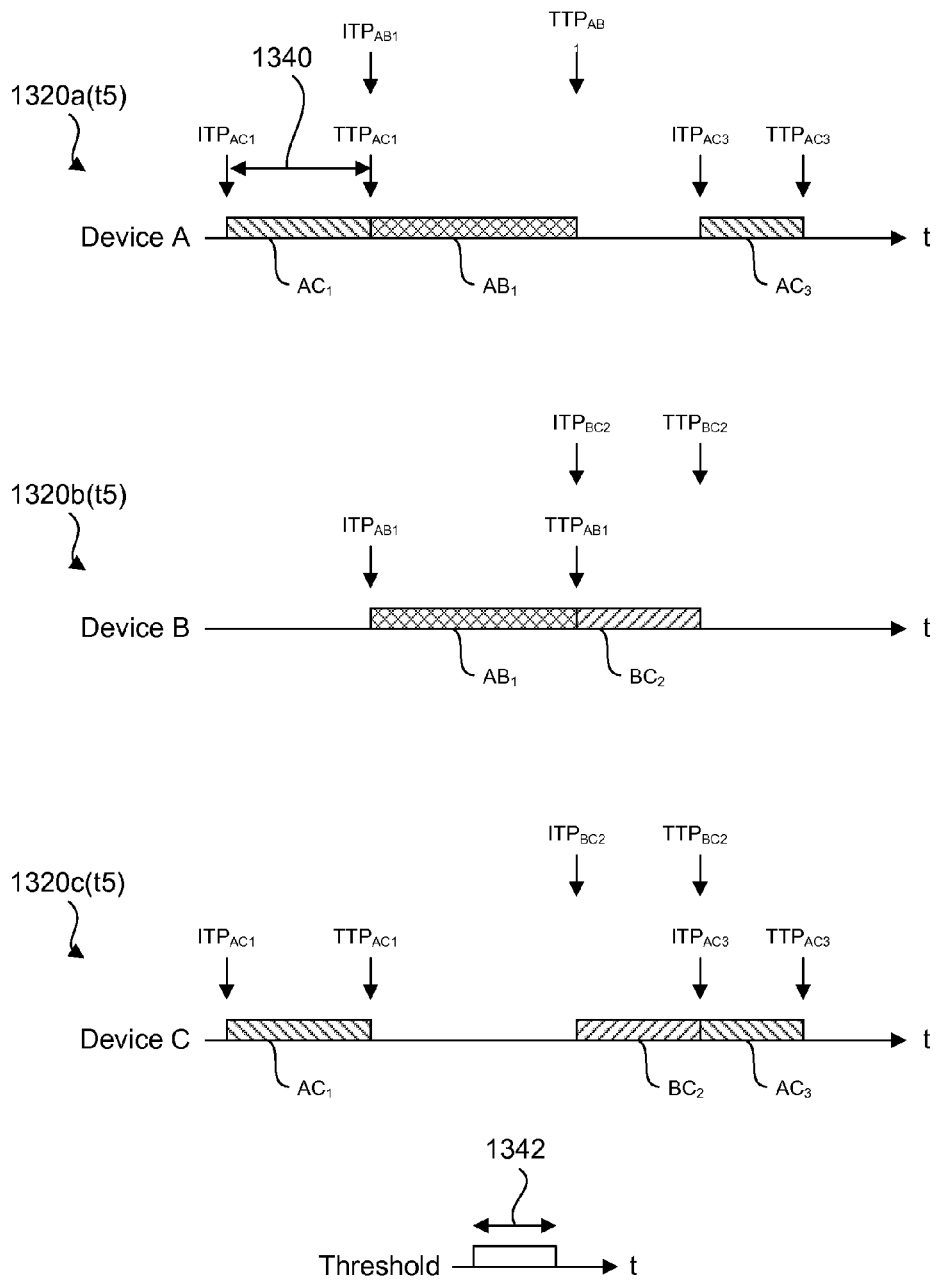
FIG. 13E illustrates the exemplary communication schedules of FIG. 13D after they have been modified to reallocate any available time periods.

Removing conflicts between communication periods 112 and eliminating short communication periods 112 may create available time periods in a communication schedule 1320. FIG. 13E shows the communication schedules 1320 at a fifth point in time, which will be referred to as $t_5$ and which occurs after the fourth point in time $t_4$ described previously. The communication schedule 1320a for device A 1302 at time $t_5$ is labeled $1320a(t_5)$, the communication schedule 1320b for device B 1304 at time $t_5$ is labeled $1320b(t_5)$, and the communication schedule 1320c for device C 1306 at time $t_5$ is labeled $1320c(t_5)$. In FIG. 13E, the communication schedules $1320a(t_5)$, $1320b(t_5)$, and $1320c(t_5)$ have been modified to reallocate any available time periods.

Reallocating available time periods may involve extending the duration 1340 of a scheduled communication period 112. For example, in the exemplary communication schedules $1320a(t_5)$, $1320b(t_5)$, and $1320c(t_5)$ shown in FIG. 13E, the duration 1340 of the $AB_1$ communication period 112 and the duration 1340 of the $AC_1$ communication period 112 have both been extended.

Typically, the duration 1340 of a scheduled communication period 112 may be extended if its duration 1340 was previously limited by another communication period 112 that has been unscheduled. For example, the $AC_2$ communication period 112 previously limited the duration of the $AB_1$ communication period 112. Therefore, unscheduling the $AC_2$ communication period 112 allowed the duration 1340 of the $AB_1$ communication period to be extended. Similarly, the $BC_1$ communication period 112 previously limited the duration of the $AC_1$ communication period 112. Therefore, unscheduling the $BC_1$ communication period 112 allowed the duration 1340 of the $AC_1$ communication period to be extended.

Extending the duration 1340 of a communication period 112 may involve deleting the termination time point 116 previously associated with the communication period 112, and then determining a new termination time point 116 for the communication period 112. Determining a new termination time point 116 for a communication period 112 may involve a negotiation process between the two electronic devices 102 that are scheduled to be involved in the communication period 112. This negotiation process will be described in greater detail below.

Figure 14:
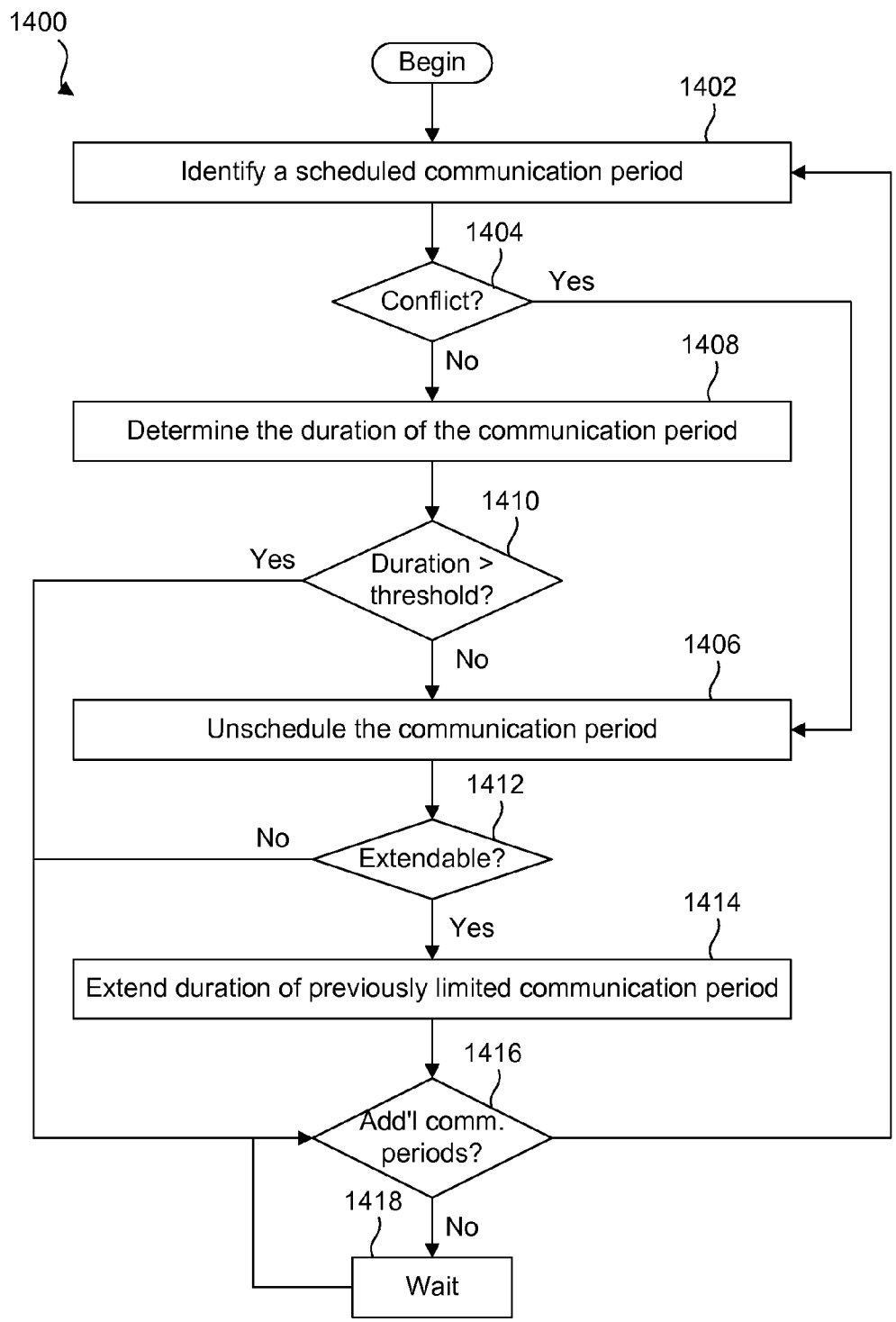
FIG. 14 is a flow diagram that summarizes the method described in connection with FIGS. 13A-13E.

FIG. 14 is a flow diagram that summarizes the method 1400 described previously in connection with FIGS. 13A-13E. The method 1400 may be carried out by one or more electronic devices 102 that are part of one or more device networks 202. For purposes of clarity in explaining the method 1400, the electronic device 102 that initiates performance of the method 1400 will be referred to as the "initiating" electronic device 102. Those skilled in the art will understand that other electronic devices 102 in the one or more device networks 202 may also function as the initiating electronic device 102.

The method 1400 may begin by identifying 1402 a communication period 112 that is scheduled between the initiating electronic device 102 and another electronic device 102. For purposes of clarity in explaining the method 1400, the communication period 112 that is identified in step 1402 will be referred to as the "current" communication period 112.

The method 1400 may then involve determining 1404 whether a conflict exists between the current communication period 112 and another communication period 112 that is scheduled to involve the initiating electronic device 102. If such a conflict exists, the method 1400 may then involve unscheduling 1406 the communication period 112.

If no conflict exists, the method 1400 may then involve determining 1408 the duration 1340 of the current communication period 112. The method 1400 may then involve determining 1410 whether the duration 1340 of the current communication period 112 exceeds a threshold duration 1342. If the duration 1340 of the current communication period 112 does not exceed the threshold duration 1342, the method 1400 may then involve unscheduling 1406 the communication period 112.

If the communication period 112 is unscheduled, the method 1400 may then involve determining 1412 whether there are any extendable communication periods 112. A communication period 112 is extendable if its duration 1340 was previously limited by the communication period 112 that was unscheduled in step 1406. If an extendable communication period 112 is found, the method 1400 may involve extending 1414 the duration 1340 of the extendable communication period 112.

The method 1400 may then involve determining 1416 whether there are additional communication periods 112 that need to be processed in accordance with the method 1400. If additional communication periods 112 are found, the method 1400 may involve returning to step 1402 and proceeding as described above. If additional communication periods 112 are not found, the method 1400 may involve waiting 1418 until additional communication periods 112 are found.

Figure 15:
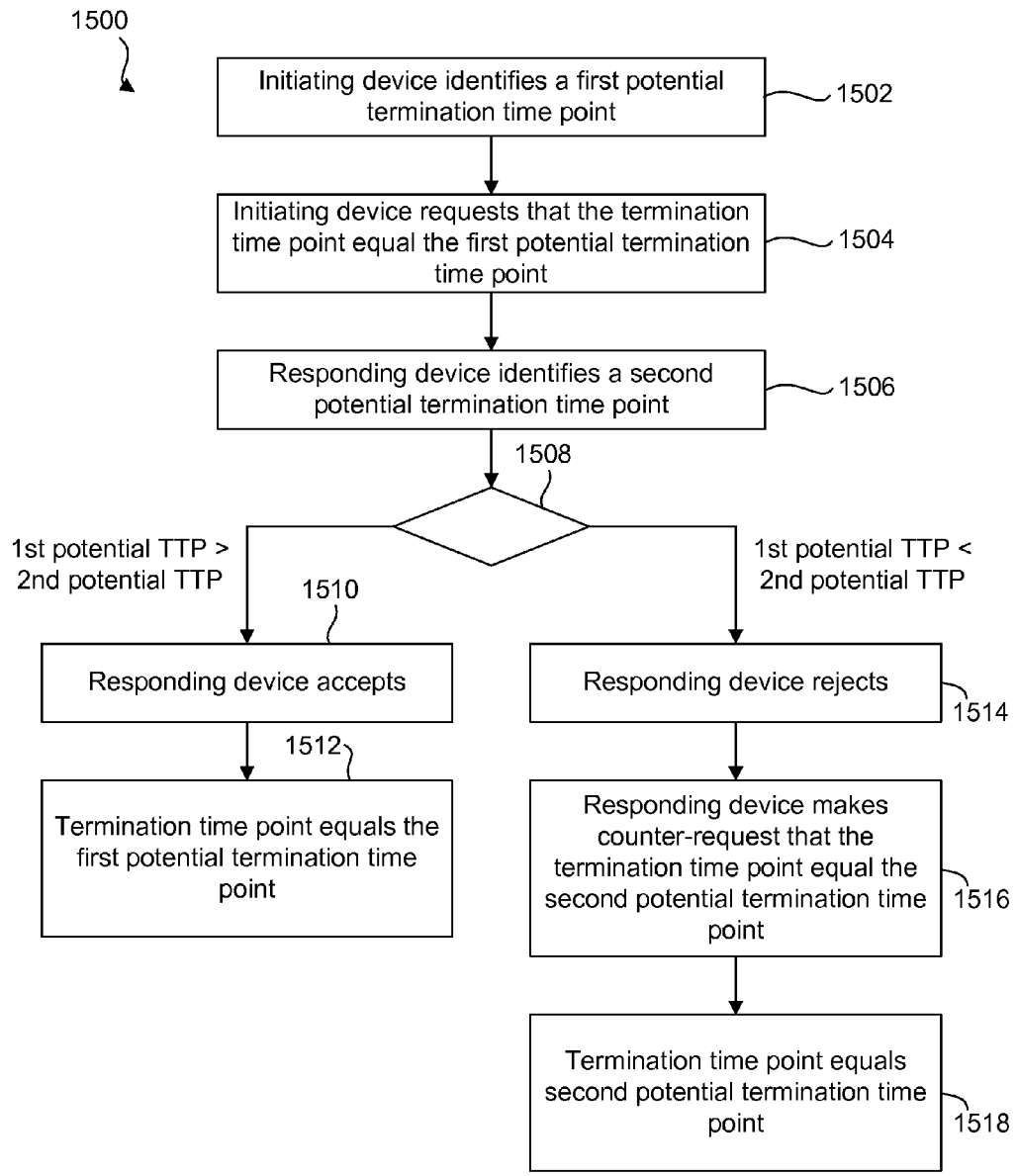
FIG. 15 is a flow diagram illustrating an embodiment of a method for determining a termination time point for a communication period.

FIG. 15 is a flow diagram illustrating an embodiment of a method 1500 for determining a termination time point 116 for a communication period 112. The method 1500 illustrated in FIG. 15 describes a negotiation process that may be carried out by two electronic devices 102 that are involved in a scheduled communication period 112. For purposes of clarity in explaining the method 1500, the electronic device 102 that initiates performance of the method 1500 will be referred to as the "initiating" device 102, and the electronic device 102 that responds to the initiating device 102 will be referred to as the responding device 102. Those skilled in the art will recognize that either of the two electronic devices 102 that are involved in a scheduled communication period 112 may function as the initiating device 102.

The method 1500 may begin when the initiating device 102 identifies 1502 a first potential termination time point 116. Typically, the first potential termination time point 116 corresponds to the next initiation time point 114 in the communication schedule 620 for the initiating device 102. The initiating device 102 may then send a message to the responding device 102 requesting 1504 that the termination time point 116 equal the first potential termination time point 116.

The responding device 102 may then identify 1506 a second potential termination time point 116. Typically, the second potential termination time point 116 corresponds to the next initiation time point 114 in the communication schedule 1320 for the responding device 102.

If the first potential termination time point 116 is earlier than the second potential termination time point 116, the responding device 102 sends 1510 an accept message to the initiating device 102. The termination time point 116 for the communication period 112 then equals 1512 the first potential termination time point 116.

If the first potential termination time point 116 is later than the second potential termination time point 116, the responding device 102 sends 1514 a reject message to the initiating device 102. The reject message may include 1516 a counter-request that the termination time point 116 for the communication period 112 equal the second potential termination time point 116. The termination time point 116 for the communication period 112 then equals 1518 the second potential termination time point 1518.

Figure 16:
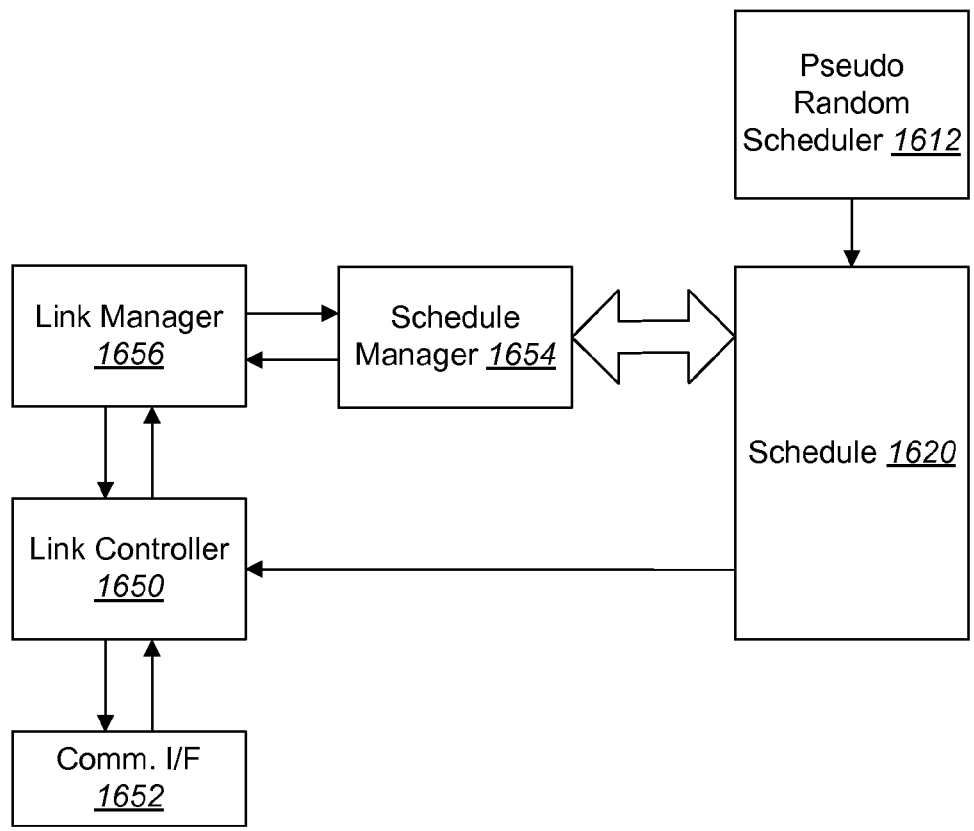
FIG. 16 illustrates logical components that may be included in an embodiment of an electronic device.

FIG. 16 illustrates logical components that may be included in an embodiment of an electronic device 102. As described previously, an electronic device 102 may include a communication schedule 1620 that is generated by a pseudo random scheduler 1612. A link controller 1650 establishes communication with other electronic devices 102 over a communication interface 1652 in accordance with the schedule 1320.

A schedule manager 1654 is able to access and modify the schedule 1620 until it 1620 is used by the link controller 1650. As previously described, the schedule manager 1654 may modify the schedule 1620 to remove short communication periods 112 and to resolve conflicts between communication periods 112. Sometimes, modifying the schedule 1620 may involve communicating with other electronic devices 102 (e.g., to determine a termination time point 116 for a communication period 112). The schedule manager 1654 may communicate with other electronic devices 102 using the link manager 1656.

In one embodiment, the schedule 1620 can be modeled as a FIFO system. In particular, as initiation time points 114 are created by the pseudo random scheduler 1612, they may be entered into the schedule 1620 in the order that they are used by the link controller 1650.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. In a first electronic device, a method comprising:
identifying a first communication period that is scheduled between the first electronic device and a second electronic device;
determining whether a conflict exists between the first communication period and a second communication period that involves the first electronic device;
unscheduling the first communication period when a conflict exists;
determining, when no conflict exists, a duration of the first communication period;
determining whether the duration of the first communication period exceeds a threshold duration;
unscheduling the first communication period when the duration of the first communication period does not exceed the threshold duration;
determining, when the duration of the first communication period does not exceed the threshold duration, whether a third communication period is extendable, wherein the third communication period is extendable when a duration of the third communication period was previously limited by the first communication period; and
extending, when the third communication period is extendable and when the duration of the first communication period does not exceed the threshold duration, the duration of the third communication period, wherein extending the duration of the third communication period comprises:
deleting a termination time point corresponding to the third communication period; and
determining a new termination time point corresponding to the third communication period.

2. The method of claim 1, wherein the first communication period comprises a first initiation time point, and wherein determining whether a conflict exists comprises determining whether the second communication period comprises a second initiation time point that is equal to the first initiation time point.

3. The method of claim 1, further comprising extending the duration of the second communication period whose duration was previously limited by the first communication period when the duration of the first communication period does not exceed the threshold duration.

4. The method of claim 3, wherein extending the duration of the second communication period comprises deleting a second termination time point for the second communication period and determining a new termination time point for the second communication period.

5. The method of claim 3, wherein the first communication period comprises a first initiation time point and a first termination time point, wherein the second communication period comprises a second initiation time point that is earlier than the first initiation time point, and wherein the second communication period comprises a second termination time point that is equal to the first termination time point.

6. The method of claim 3, wherein extending the duration of the second communication period comprises negotiating with a third electronic device about a new termination time point for the second communication period.

7. The method of claim 1, wherein the first communication period comprises a first initiation time point, and wherein determining the duration of the first communication period comprises determining a first termination time point for the first communication period.

8. The method of claim 7, wherein determining the first termination time point comprises negotiating with the second electronic device about the first termination time point.

9. The method of claim 7, wherein determining the first termination time point for the first communication period comprises generating the first termination time point when the first initiation time point is generated.

10. The method of claim 9, wherein negotiating with the second electronic device comprises:
identifying a first potential termination time point for the first communication period;
sending a request message to the second electronic device, the request message comprising a request that the first termination time point be equal to the first potential termination time point;
receiving an accept message from the second electronic device if the first potential termination time point occurs before a second potential termination time point identified by the second electronic device; and
receiving a reject message from the second electronic device if the first potential termination time point occurs after the second potential termination time point, the reject message comprising a counter-request that the first termination time point be equal to the second potential termination time point.

11. The method of claim 7, wherein the first initiation time point and the first termination time point are stored in a communication schedule, and wherein unscheduling the first communication period comprises deleting the first initiation time point and the first termination time point from the communication schedule.

12. The method of claim 1, wherein the first electronic device is part of a first device network, and wherein the second electronic device is part of a second device network.

13. The method of claim 12, wherein the first device network comprises a first piconet, and wherein the second device network comprises a second piconet.

14. The method of claim 1, further comprising providing a plurality of pseudo-random time points that define scheduled communication periods between the first electronic device and the second electronic device.

15. The method of claim 14, wherein the first communication period comprises a first initiation time point that corresponds to one of the plurality of pseudo-random time points.

16. A first electronic device, comprising:
a processor;
memory in electronic communication with the processor;
a communication schedule; and
a schedule manager configured to:
identify a first communication period that is scheduled between the first electronic device and a second electronic device;
determine whether a conflict exists between the first communication period and a second communication period that involves the first electronic device;
unschedule the first communication period when a conflict exists;
determine, when no conflict exists, a duration of the first communication period;
determine whether the duration of the first communication period exceeds a threshold duration;
unschedule the first communication period when the duration of the first communication period does not exceed the threshold duration;
determine, when the duration of the first communication period does not exceed the threshold duration, whether a third communication period is extendable, wherein the third communication period is extendable when a duration of the third communication period was previously limited by the first communication period; and extend, when the third communication period is extendable and when the duration of the first communication period does not exceed the threshold duration, the duration of the third communication period, wherein extending the duration of the third communication period comprises:

deleting a termination time point corresponding to the third communication period; and determining a new termination time point corresponding to the third communication period.

17. A non-transitory computer-readable medium for storing program data, wherein the program data comprises executable instructions for:

identifying a first communication period that is scheduled between a first electronic device and a second electronic device;

determining whether a conflict exists between the first communication period and a second communication period that involves the first electronic device;

unscheduling the first communication period when a conflict exists;

determining, when no conflict exists, a duration of the first communication period;

determining whether the duration of the first communication period exceeds a threshold duration;

unscheduling the first communication period when the duration of the first communication period does not exceed the threshold duration;

determining, when the duration of the first communication period does not exceed the threshold duration, whether a third communication period is extendable, wherein the third communication period is extendable when a duration of the third communication period was previously limited by the first communication period; and extending, when the third communication period is extendable and when the duration of the first communication period does not exceed the threshold duration, the duration of the third communication period, wherein extending the duration of the third communication period comprises:

deleting a termination time point corresponding to the third communication period; and determining a new termination time point corresponding to the third communication period.

* * * * *